(12) United States Patent
Benefield et al.

(10) Patent No.: US 8,417,608 B2
(45) Date of Patent: Apr. 9, 2013

(54) DYNAMICALLY PROVIDING FINANCIAL SOLUTION RECOMMENDATIONS

(75) Inventors: Stefani R. Benefield, Milton, FL (US); Eric E. Ellis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 13/038,132

(22) Filed: Mar. 1, 2011

(65) Prior Publication Data

US 2011/0178908 A1  Jul. 21, 2011

Related U.S. Application Data

(63) Continuation-in-part of application No. 12/359,887, filed on Jan. 26, 2009.

(51) Int. Cl.
*G06Q 40/00* (2006.01)
(52) U.S. Cl. .......... 705/35; 36/37; 36/7.13; 36/26.1; 715/221
(58) Field of Classification Search .......... 705/35–37, 705/4, 26.1, 7.13; 715/221
See application file for complete search history.

(56) References Cited

U.S. PATENT DOCUMENTS

| | | | | |
|---|---|---|---|---|
| 5,799,287 | A * | 8/1998 | Dembo ............... | 705/36 R |
| 6,996,539 | B1 * | 2/2006 | Wallman ............. | 705/36 T |
| 7,490,050 | B2 * | 2/2009 | Grover et al. ........ | 705/4 |
| 7,783,545 | B2 * | 8/2010 | Sloan et al. .......... | 705/36 R |

OTHER PUBLICATIONS

U.S. Appl. No. 13/038,136, filed Mar. 1, 2011.
U.S. Appl. No. 13/038,137, filed Mar. 1, 2011.
Extended European Search Report dated Jan. 29, 2010 for European Patent Application No. EP 09 25 2414.

* cited by examiner

*Primary Examiner* — Harish T Dass
(74) *Attorney, Agent, or Firm* — Michael A. Springs; Moore & Van Allen PLLC; James C. Moore

(57) ABSTRACT

Systems, methods, and computer program products are provided for dynamically building financial solution recommendations based on received inputs. These inputs, which may be received from the customer, an associate collaborating with the customer or from a customer database, may include customer behaviors, customer attitudes, customer life events, customer life interests, customer personal/profile data, customer financial data, such as portfolio data and the like. Based on the received inputs, financial solution recommendations are determined and presented to the customer in real time or near time. As such, the customer is able to instantaneously see how each input of recommendation criteria impacts the financial solution recommendations. Further, embodiments of the present invention provide for inputs to the financial solution recommendation tool/module to be received in a non-linear fashion, such that a customer or a collaborating associate may provide inputs at various entry points to accommodate specific financial solution needs of the customer.

28 Claims, 28 Drawing Sheets

DYNAMICALLY PROVIDING FINANCIAL SOLUTION RECOMMENDATIONS

CROSS-REFERENCE TO RELATED APPLICATION

This application is a continuation-in-part of co-pending patent application Ser. No. 12/359,887, filed Jan. 26, 2009 entitled "Interactive and Collaborative Financial Customer Experience Application", assigned to the same inventive entity as the present application; the entire disclosure of which is incorporated herein by reference.

FIELD

In general, embodiments herein disclosed relate to financial services and, more specifically, providing a financial customer experience that is capable of dynamically presenting financial solution recommendations in response to user inputs.

BACKGROUND

Financial institutions, such as banks and the like, not unlike other businesses, are highly concerned with customer satisfaction. In this regard, the experiences that the customer encounters when interfacing with the financial institution shape the customer's perceptions and attitudes toward the bank, which, in turn, may influence the customer's tendency to do business with the bank or increase the volume of business with the bank.

Paramount to the issue of customer perception is the experience that a customer encounters when initially contacting a financially institution (e.g., telephone contact, in-person contact, online contact, mobile contact or the like) to inquire about available products and/or services or open accounts. Traditionally, the initial telephone, in-person, online or mobile encounter has been provided in an environment whereby the financial associate, call center representative or network system, queries the customer with multiple personal questions, and returns financial product and/or service options to the customer. The associate, representative or system then explains the options or recommendations to the customer as a means of marketing what the bank may have to offer the customer.

Unfortunately, this traditional dynamic for providing financial product/service recommendations and explaining product/service options is, in most instances, not viewed as a highly collaborative effort between the customer and the financial institution. Other than answering the questions posed by the banking associate during the initial interview process, many of which are limited to questions concerning the customer's current financial portfolio, the involvement of the customer in the recommendation process is limited.

If the initial exposure by the customer to the bank is made more of a collaborative effort and involves more insight into the customer's current, as well as long-term financial needs, more trust can be established at the onset of the relationship between the customer and the financial institution. Not unlike other business or personal relationships, by establishing trust from the onset the customer is more apt to seek additional financial products and services in the future.

Additionally, traditional financial product/service interaction between customers and banks is limited in the type of information that is acquired from the customer and, in turn, used to make financial product/service recommendations. In many instances, the information that is relied on to make financial product/service recommendations is related to the current customer's financial portfolio. The problem with solely relying on customer financial portfolios is two-fold. First, a customer may be reluctant to be forthright with divulging all of their current financial assets and/or debts, in which case, the bank is left to make financial product/service recommendations or offers based on inaccurate information. Moreover, by relying solely on financial portfolio information, the recommendations and offers afforded the customer do not account for the customer's financial behaviors, the customer's attitude toward certain financial products or services or the like. Additionally, the recommendation or offers afforded the customer do not account for future foreseen events in the customer's lifetime that may have an impact on the financial products/services that are currently of value to the customer or may have value in the future.

Therefore, a need exists to develop methods, systems, computer program products and the like which provide for an interactive and collaborative customer experience that results in financial solution recommendations and selection by the customer of the same. The collaborative nature of the customer experience should be one that results in establishing trust between the customer and the financial institution. In addition, the collaborative nature of the customer experience should rely on more than financial portfolio information in determining customer needs and, hence, financial solution recommendations.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for an interactive and collaborative customer solution recommendation tool/module for marketing financial products, services and related offers (collectively referred to herein as "financial solutions") to customers. According to one embodiment of the present invention, customers are able to dynamically build financial solution recommendations based on received inputs. These inputs, which may be received from the customer, an associate collaborating with the customer or from a customer database, may include customer behaviors, customer attitudes, customer life events, customer life interests, customer personal/profile data, customer financial data, such as portfolio data and the like. Based on the received inputs, financial solution recommendations are determined and presented to the customer in real time or near time to received input. As such, the customer is able to instantaneously see how each input of data impacts the financial solution recommendations allowing them to have transparency to the exchange of value. Further, embodiments of the present invention provide for inputs to the financial solution recommendation tool/module to be received in a non-linear fashion, such that a customer or a collaborating associate may enter the tool/module at various different entry points and provide associated inputs based on the financial solution needs and desires of the customer.

A method for dynamically providing financial solution recommendations defines first embodiments of the invention. The method includes receiving a plurality of inputs that each defines criteria for recommending financial solutions. The method additionally includes determining, each time one or more of the inputs is received, one or more financial solution recommendations based on current inputs received and providing, in real-time or near-real time to receiving an input, the one or more financial solution recommendations to a user interface. As such, the customer is capable of immediate comprehension of an impact that an input has on the one or more financial solution recommendations.

According to specific embodiments of the method, each of the received inputs define at least one of a customer financial behavior, a customer financial attitude, a customer life event, a customer life interest, customer personal data or customer financial portfolio data.

In further specific embodiments of the method, the inputs are received in a non-linear order. In such embodiments, the non-linear order may be based on the customer's financial solution recommendation needs and/or desires.

In still further embodiments of the method, the inputs are based on one or more queries posed to the customer; the queries may be electronic queries provided via the module/tool or queries posed by collaborating associate. In related embodiments, the inputs are received or derived from stored customer data; including one or more of profile data, account data, or transaction data. In still further related embodiments, the inputs are based on both one or more queries posed to the customer and one or more inputs received or derived from stored customer data; including one or more of profile data, account data, or transaction data.

In additional embodiments of the method, the financial solution recommendations include at least one of a financial product, a financial service or an offer related to a financial product or a financial service.

Moreover, in further embodiments the method includes receiving, one or more financial solution-customization inputs based on the one or more financial solution recommendations provided in the user interface. In such embodiments the one or more financial solution-customization inputs that provide for comparing, on the user interface, one or more customized financial solutions to the one or more financial solution recommendations that are provided in the user interface. In such embodiments, the method may further include providing, in real-time or near-real time to receiving the solution-customization input, a notation configured to alert the customer if the financial solution-customization input conflicts with a previous input.

In addition specific embodiments of the method, providing further includes providing access to one or more networked multi-media demonstrations, each demonstration related to one or more of the financial solution recommendations that are provided. In related embodiments, providing further includes providing access to one or more networked tutorials, each tutorial related to one or more of the financial solution recommendations that are provided.

Additionally, in specific embodiments of the method determining further include determining a best-fit financial solution recommendation based on two or more received inputs defining conflicting criteria for financial solution recommendations. In such embodiments, providing may further include providing, via the user interface associated with the computing device, in real-time or near-real time to receiving an input, the best-fit financial solution recommendation, including notation that alerts the customer that the one or more best-fit financial solution recommendations may conflict with one or more received inputs.

An apparatus for providing dynamic financial solution recommendations defines second embodiments of the invention. The apparatus includes a computing platform having at least one processor and a memory in communication with the processor. The apparatus further includes a financial solution recommendation module stored in the memory and executable by the processor. The module is configured to receive a plurality of inputs that each define criteria for recommending financial solutions; determine, each time one or more of the inputs is received, one or more financial solution recommendations based on current inputs received; and provide, in real-time or near-real time to receiving an input, a user interface that includes the one or more financial solution recommendations.

In specific embodiments of the apparatus, the module is further configured to receive the plurality of inputs, such that each of the inputs define at least one of a customer financial behavior, a customer financial attitude, a customer life event, a customer life interest, customer personal data or customer financial portfolio data.

In other specific embodiments of the apparatus, the module is configured to receive the plurality of inputs in a non-linear order. In such embodiments, the non-linear order in which the inputs are received may be based on the customer's financial solution recommendation needs.

In still further specific embodiments of the apparatus, the module is further configured to receive the plurality of inputs, such that one or more of the inputs are based on one or more queries posed to the customer; the queries may be electronic queries provided via the module/tool or queries may be posed by collaborating associate. In related embodiments the module may further be configured to receive customer data from a customer database and derive one or more of the inputs from the customer data; the customer data includes one or more of profile data, account data, or transaction data. In still further related embodiments, the module may be configured receive one or more of the inputs based on one or more queries posed to the customer and derive one or more inputs from the customer data; the customer data includes one or more of profile data, account data, or transaction data.

In still further specific embodiments of the apparatus, the module is configured to determine the one or more financial solution recommendations; the financial solution recommendations including at least one of a financial product, a financial service or an offer related to a financial product or a financial service.

Moreover, in additional specific embodiments, the module is further configured to receive one or more financial solution-customization inputs based on the one or more financial solution recommendations provided in the user interface. In such embodiments of the apparatus, the module may be further configured to receive the one or more financial solution-customization inputs that provide for comparing, on the user interface, one or more customized financial solutions to the one or more financial solution recommendations provided in the user interface. In such embodiments, the module may be further configured to provide, in real-time or near-real time to receiving the solution-customization input, a notation configured to alert the customer if the financial solution-customization input conflicts with a previous input.

In additional specific embodiments of the apparatus, the module is further configured determine a best-fit financial solution recommendation based on two or more received inputs defining conflicting criteria for financial solution recommendations. In such embodiments, the module may further be configured to provide, via the user interface associated with the computing device, in real-time or near-real time to receiving an input, the best-fit financial solution recommendation, including notation that alerts the customer that the best-fit financial solution recommendation may conflict with one or more received inputs.

A computer program product that includes a non-transitory computer-readable medium provides for third embodiments of the invention. The computer-readable medium includes a first set of codes for causing a computer to receive a plurality of inputs that each defines criteria for recommending financial solutions. In addition, the computer-readable medium includes a second set of codes for causing a computer to determine, each time one of the inputs is received, one or more financial solution recommendations based on current inputs received. Additionally, the computer-readable medium includes a third set of codes for causing a computer to provide, in real-time or near-real time to receiving an input, the one or more financial solution recommendations.

Thus, present embodiments described in greater detail below include systems, methods, and computer program products that provide customers the ability to dynamically build financial solution recommendations based on received inputs. These inputs, which may be received from the customer, an associate collaborating with the customer or from a customer database, may include customer behaviors, customer attitudes, customer life events, customer life interests, customer personal/profile data, customer financial data, such as portfolio data and the like. Based on the received inputs, financial solution recommendations are determined and presented to the customer in real time or near time. As such, the customer is able to instantaneously see how each input of recommendation criteria impacts the financial solution recommendations. Further, embodiments of the present invention provide for inputs to the financial solution recommendation tool/module to be received in a non-linear fashion, such that a customer or a collaborating associate may enter the tool/module at various different data entry points and provide associated inputs based on the financial solution needs and desires of the customer.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
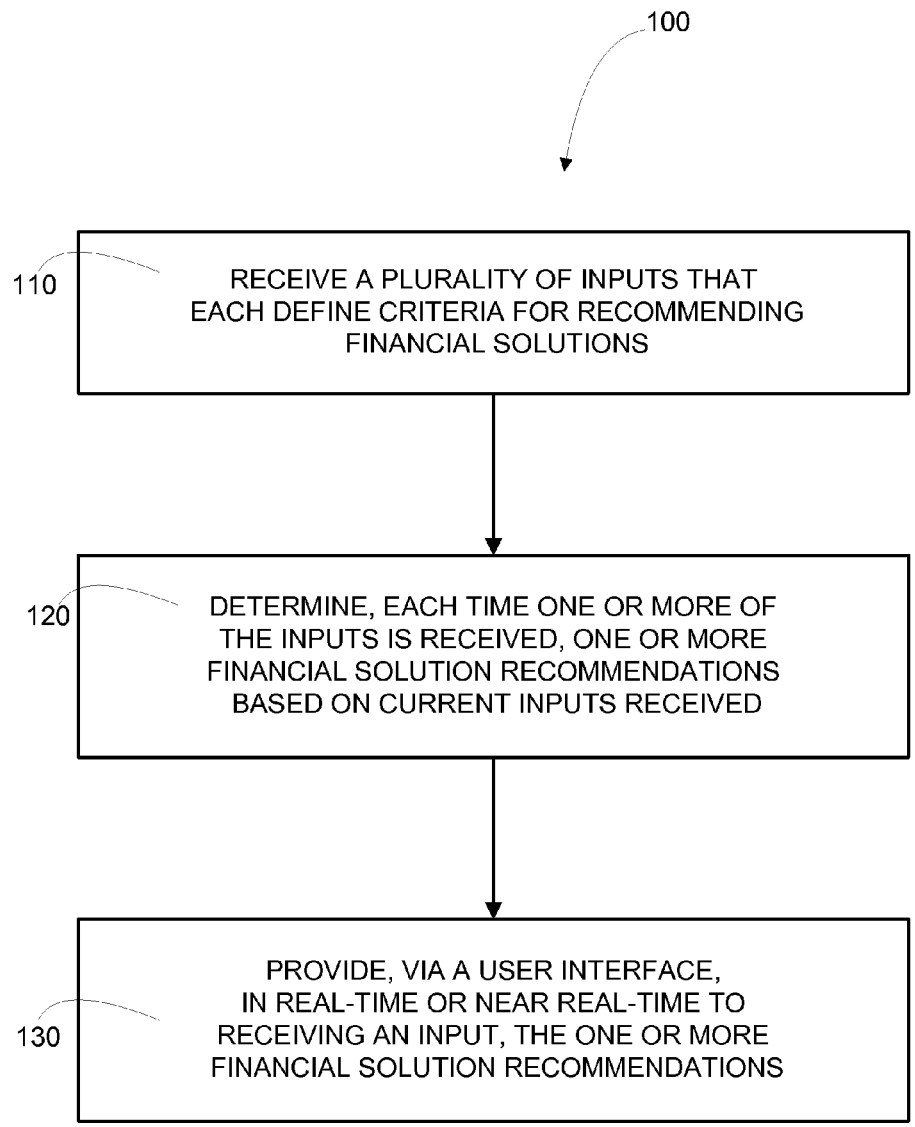
Figure 2:
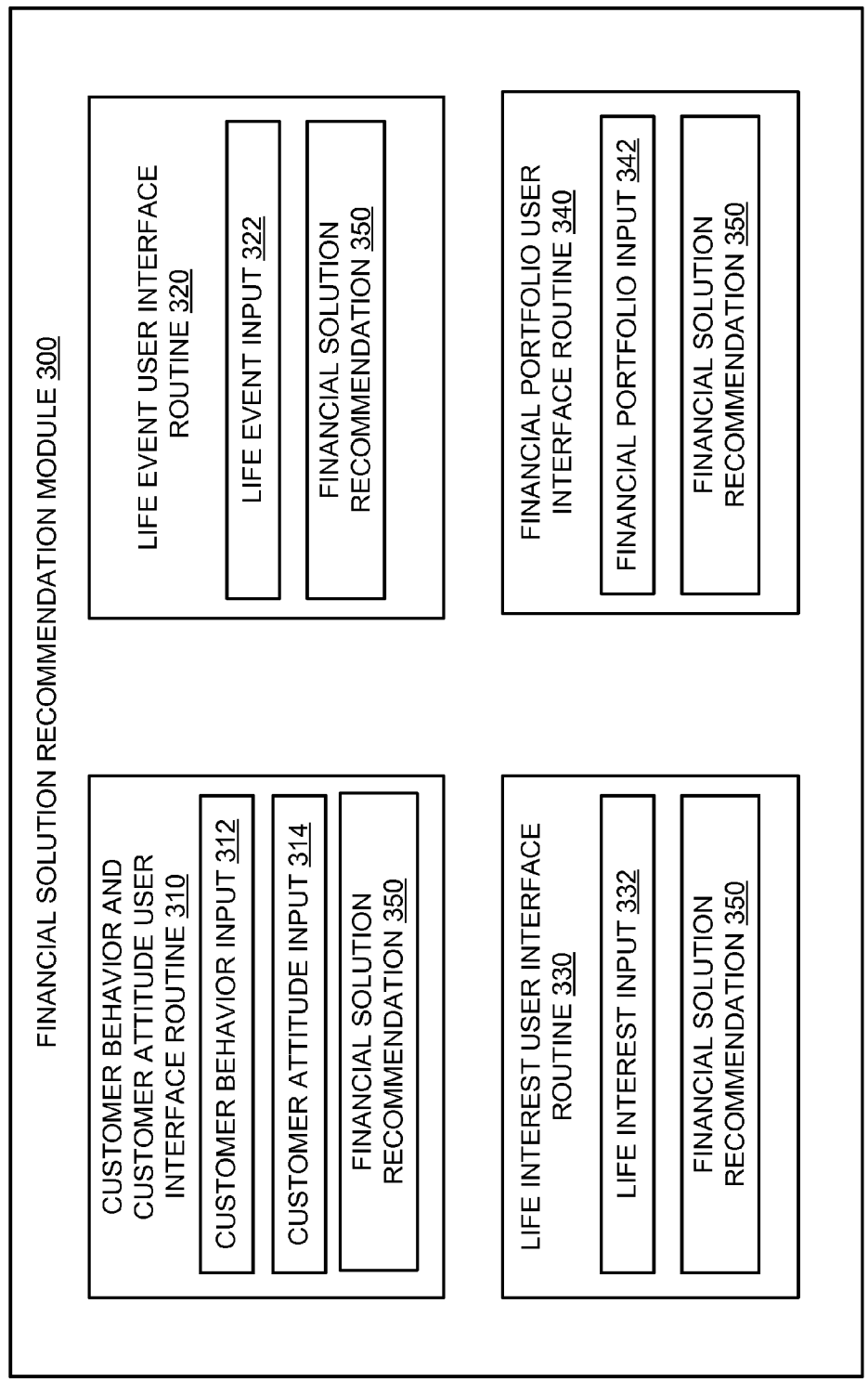
Figure 3:
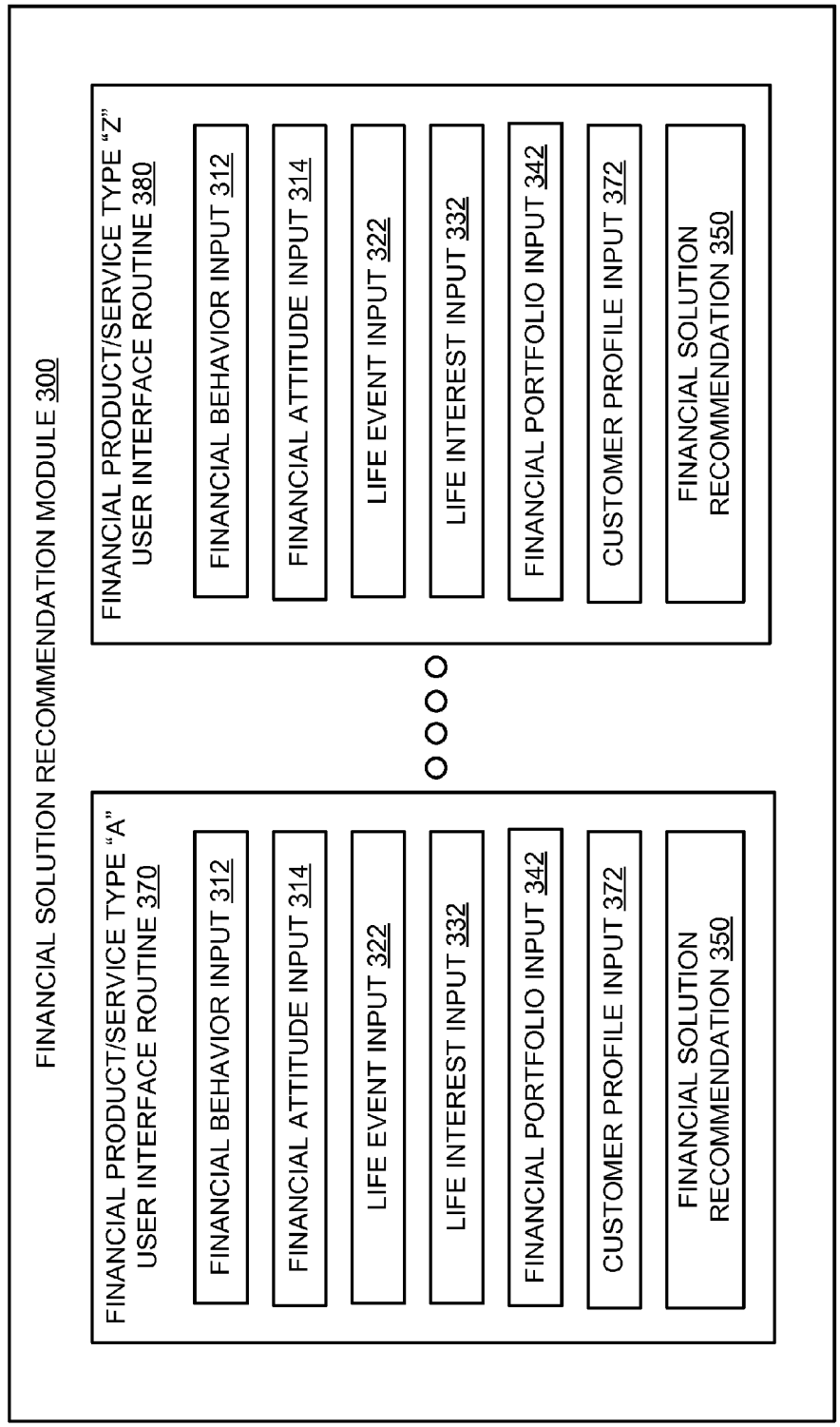
Figure 4:
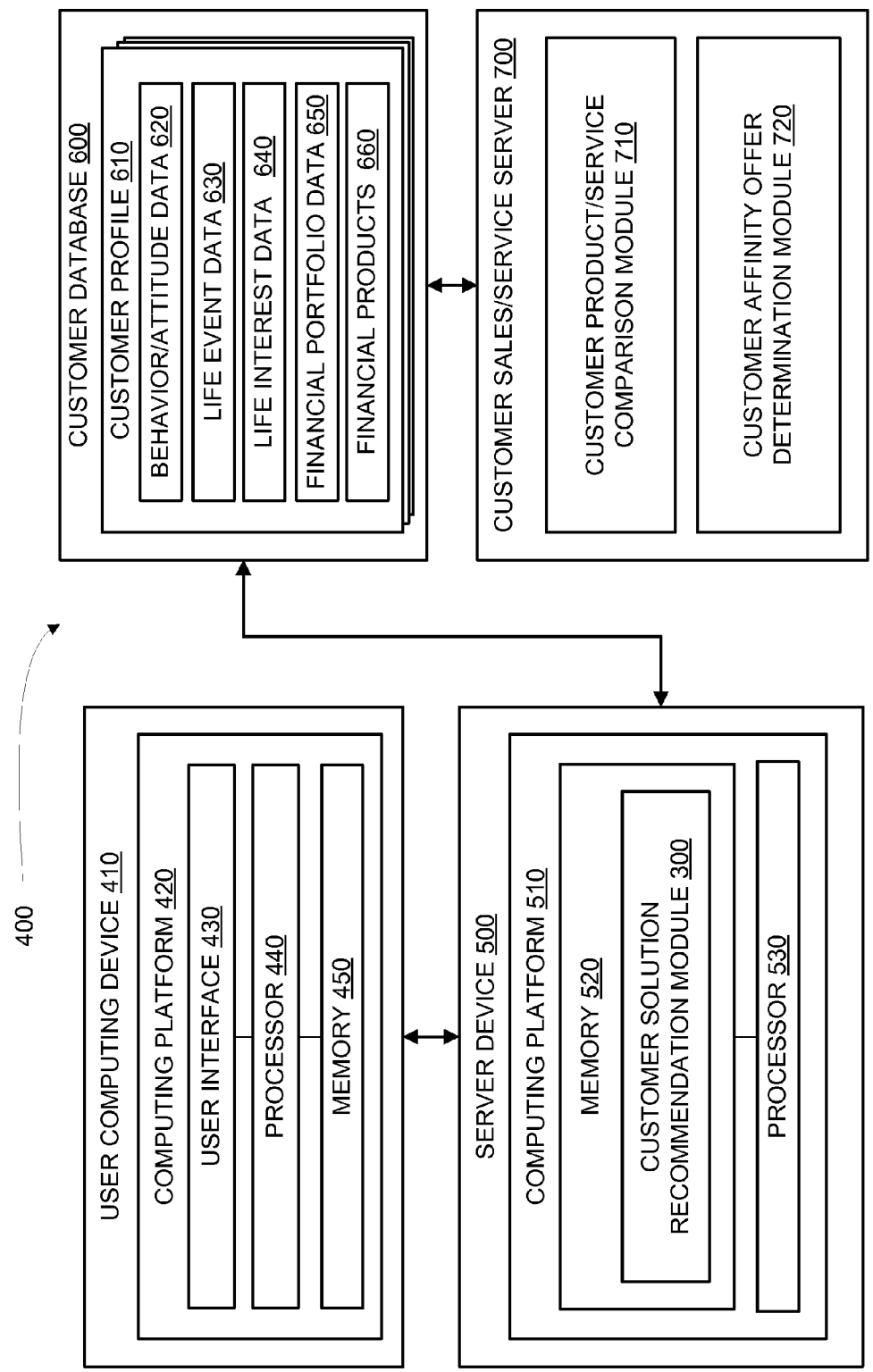
Figure 5:
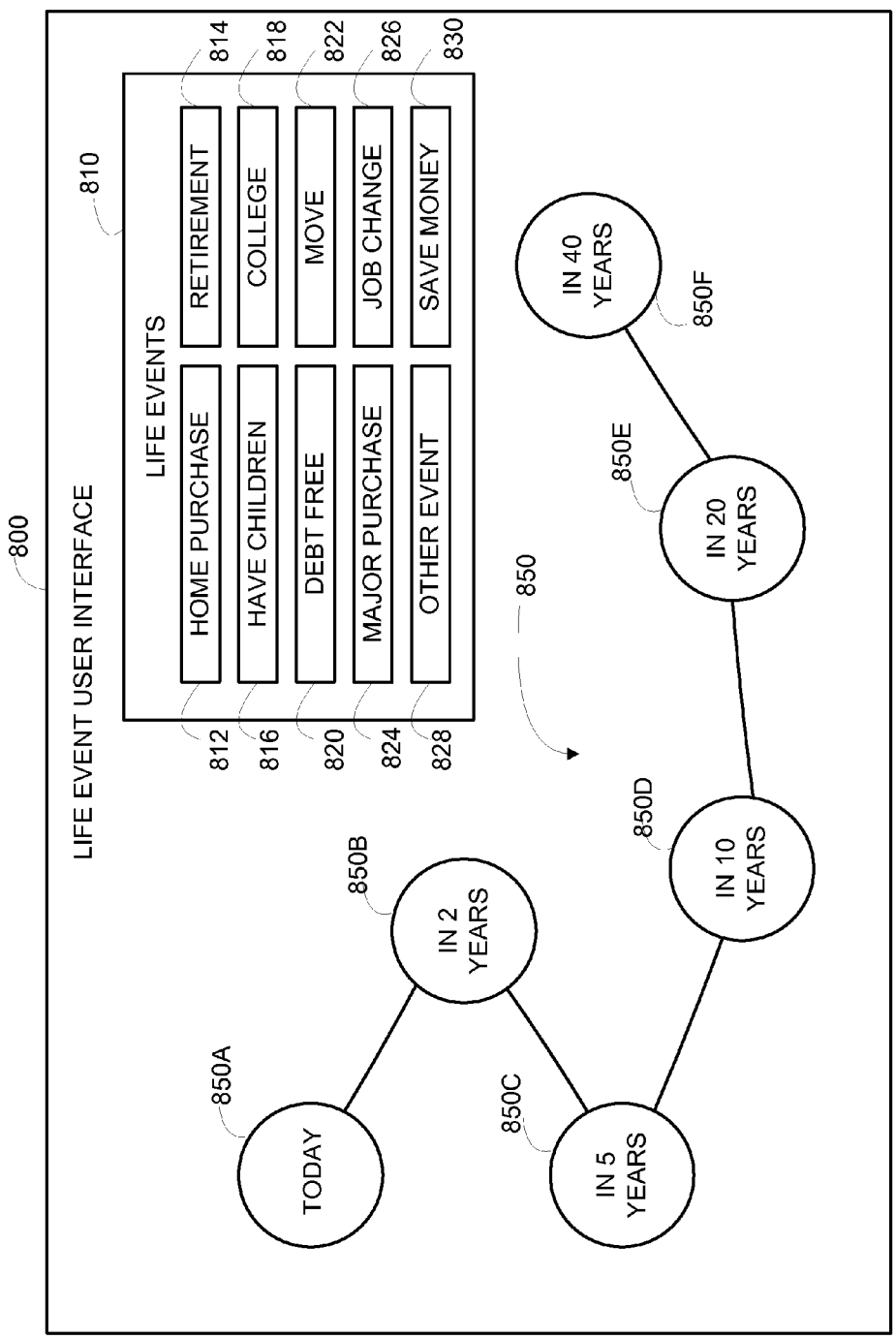
Figure 6:
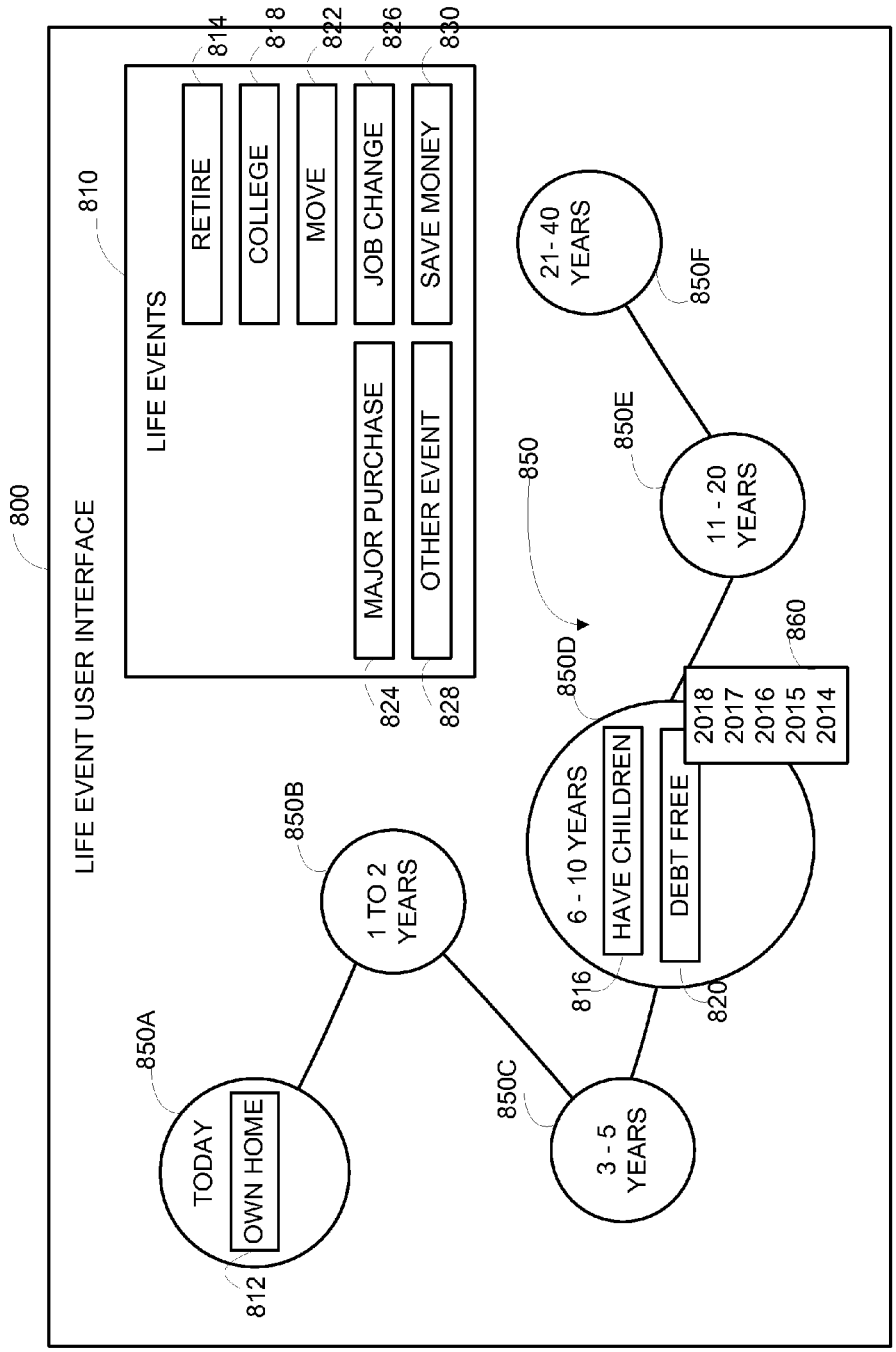
Figure 7:
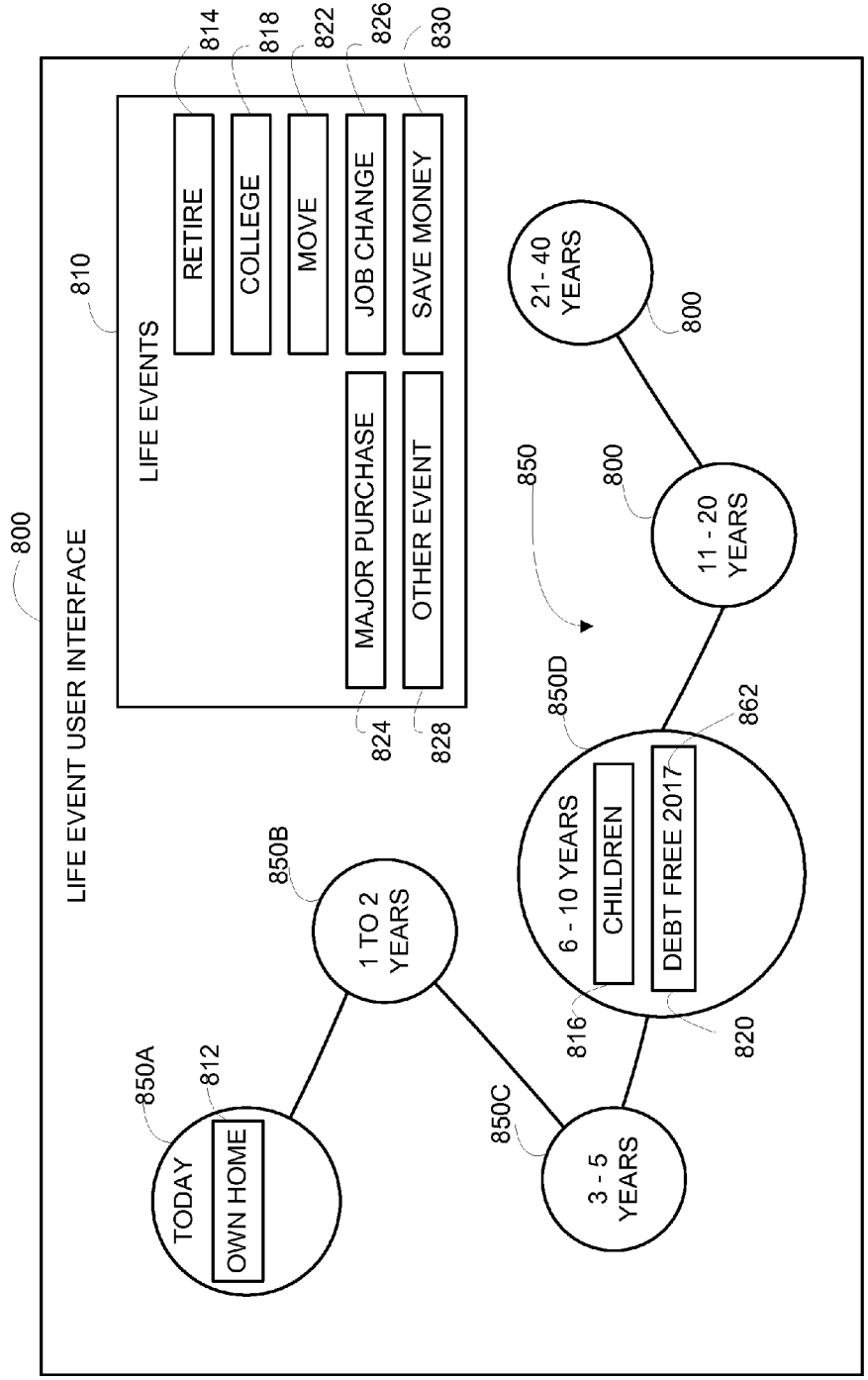
Figure 8:
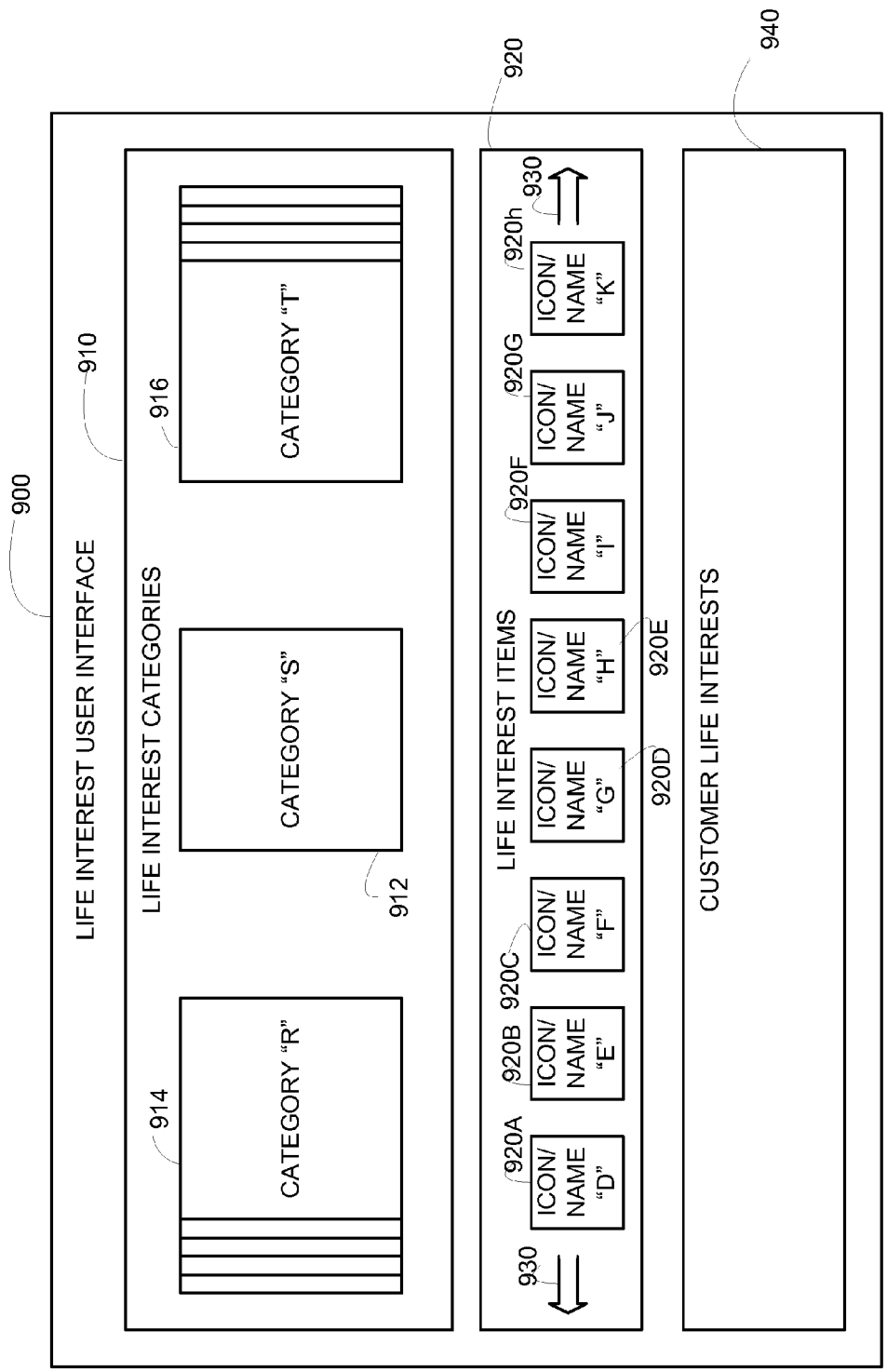
Figure 9:
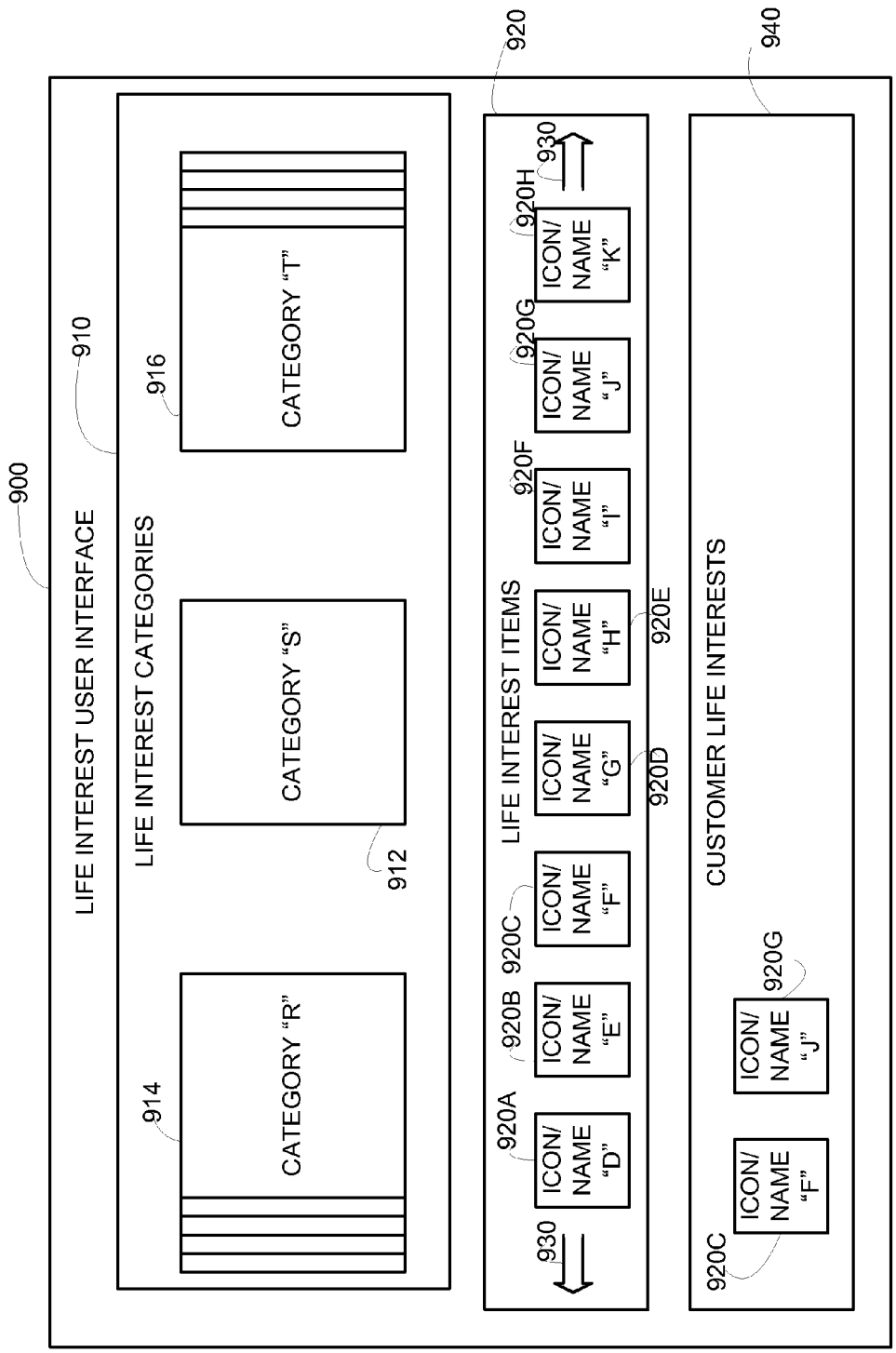
Figure 15:
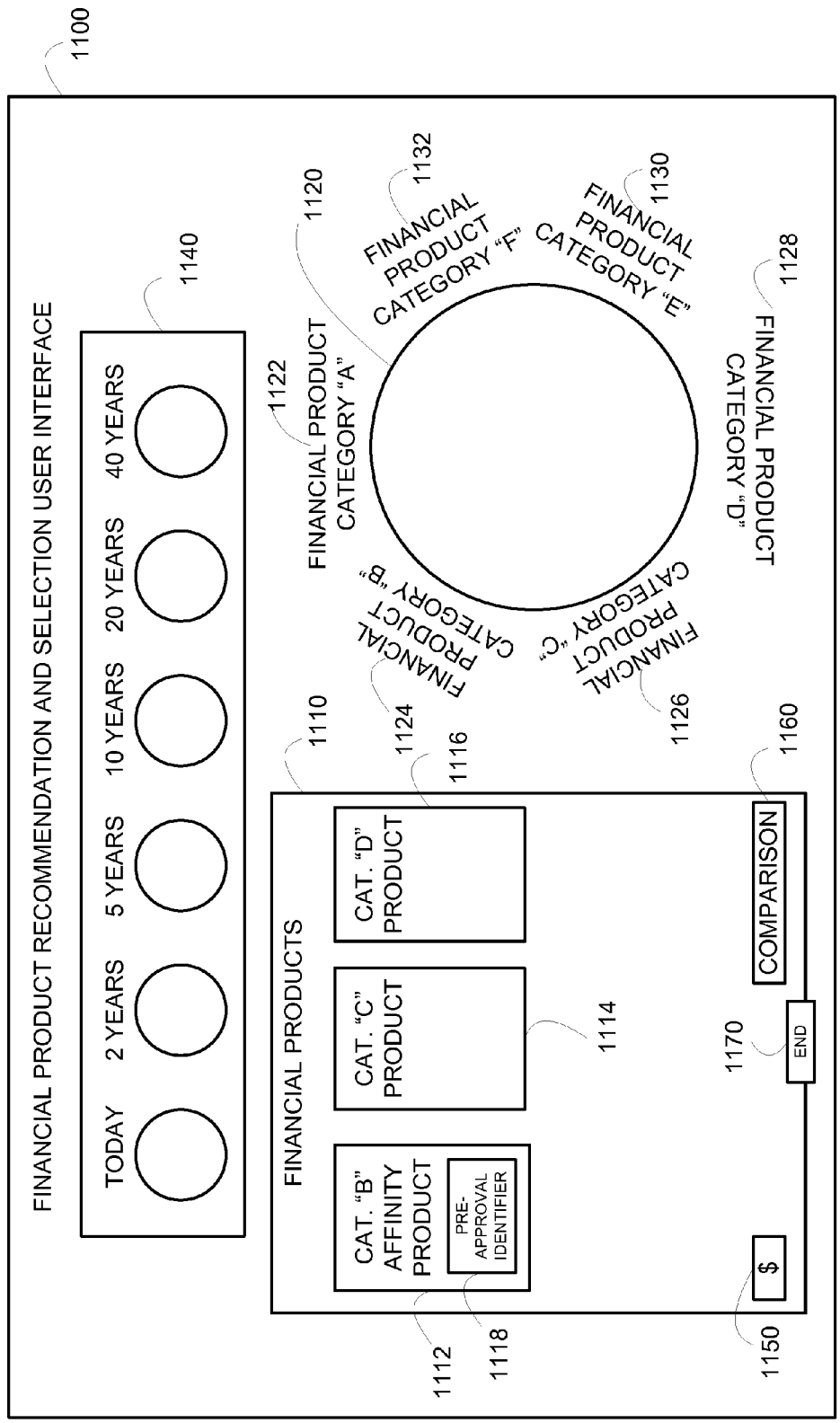
Figure 16:
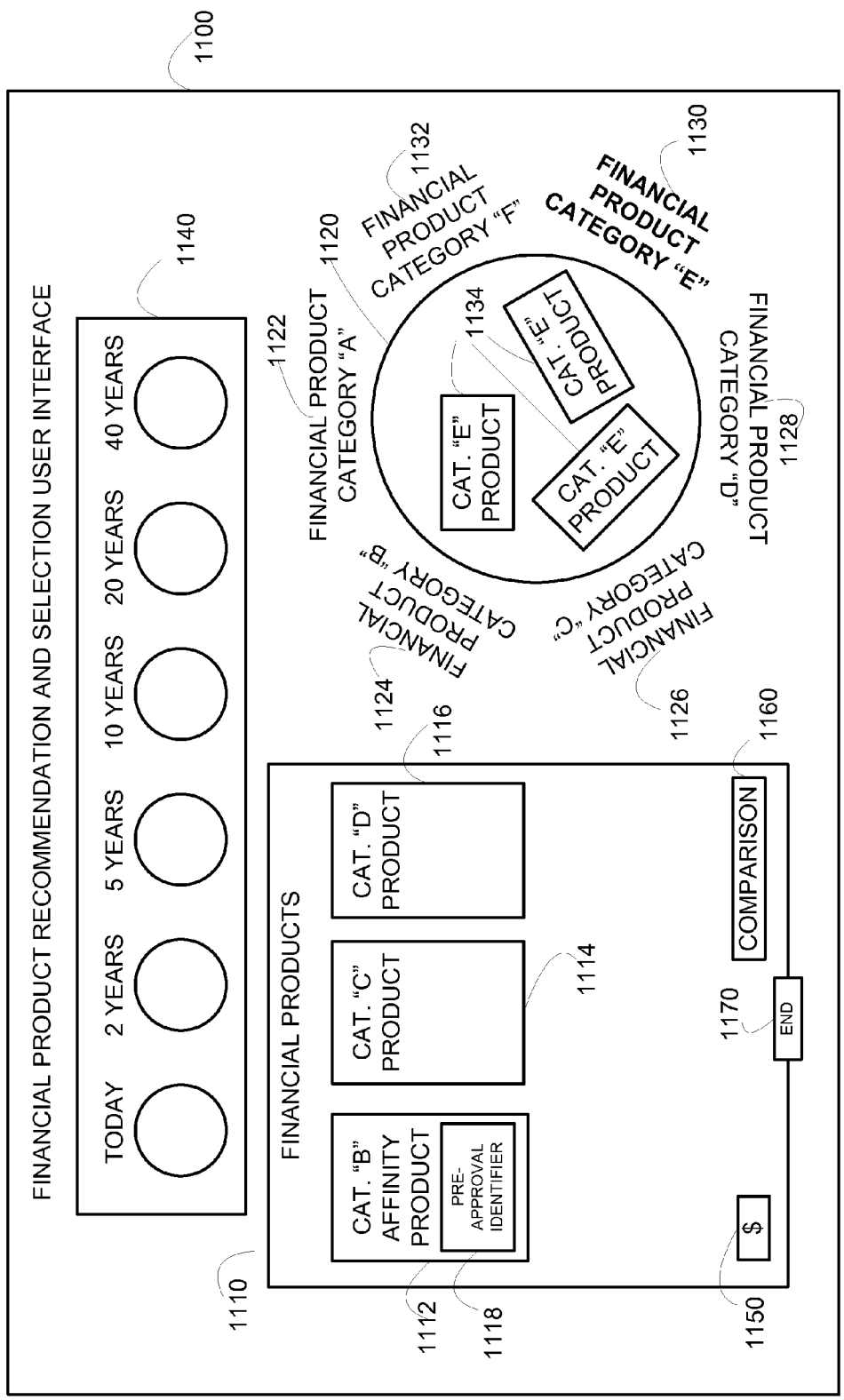
Figure 17:
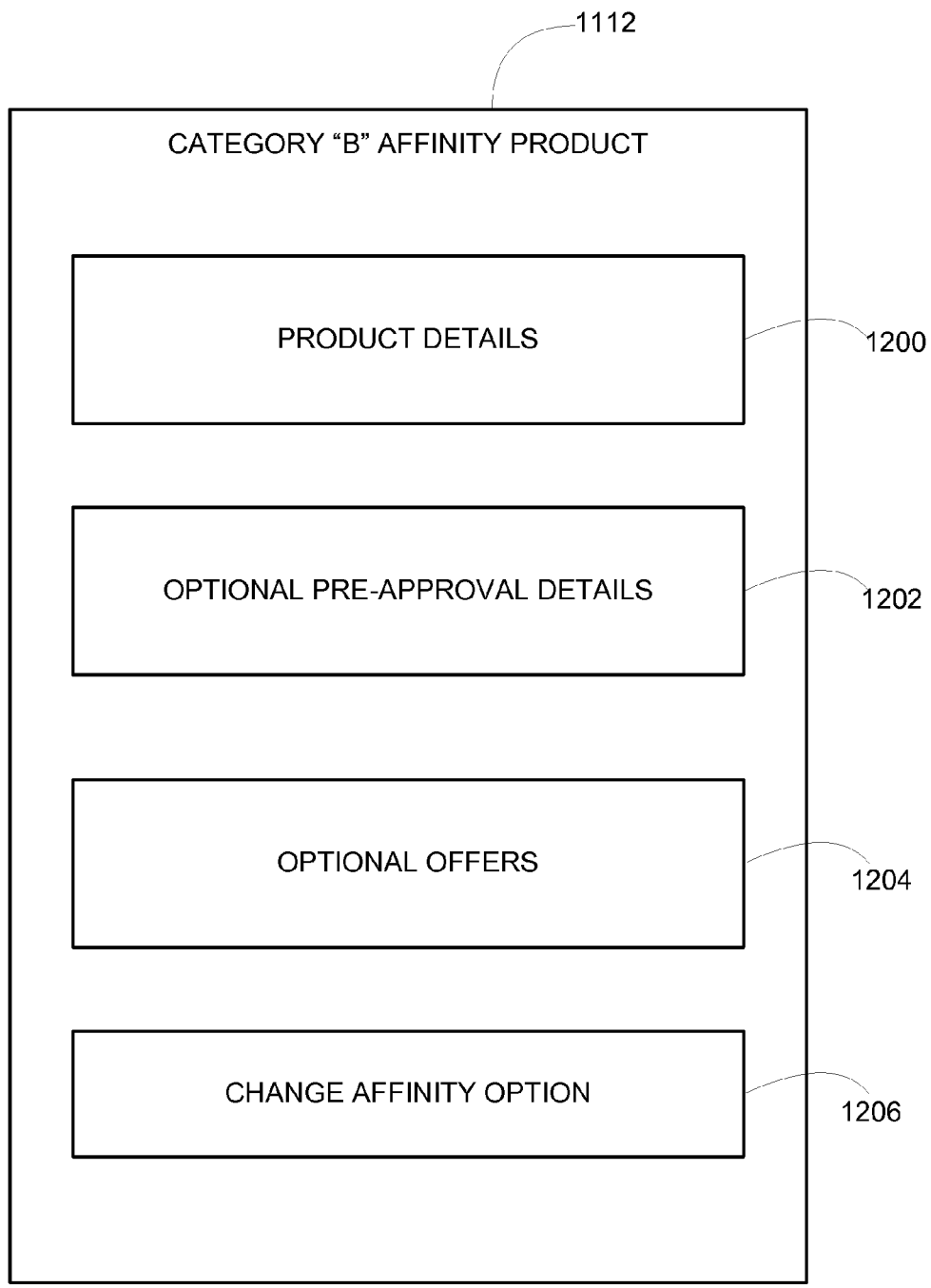
Figure 18:
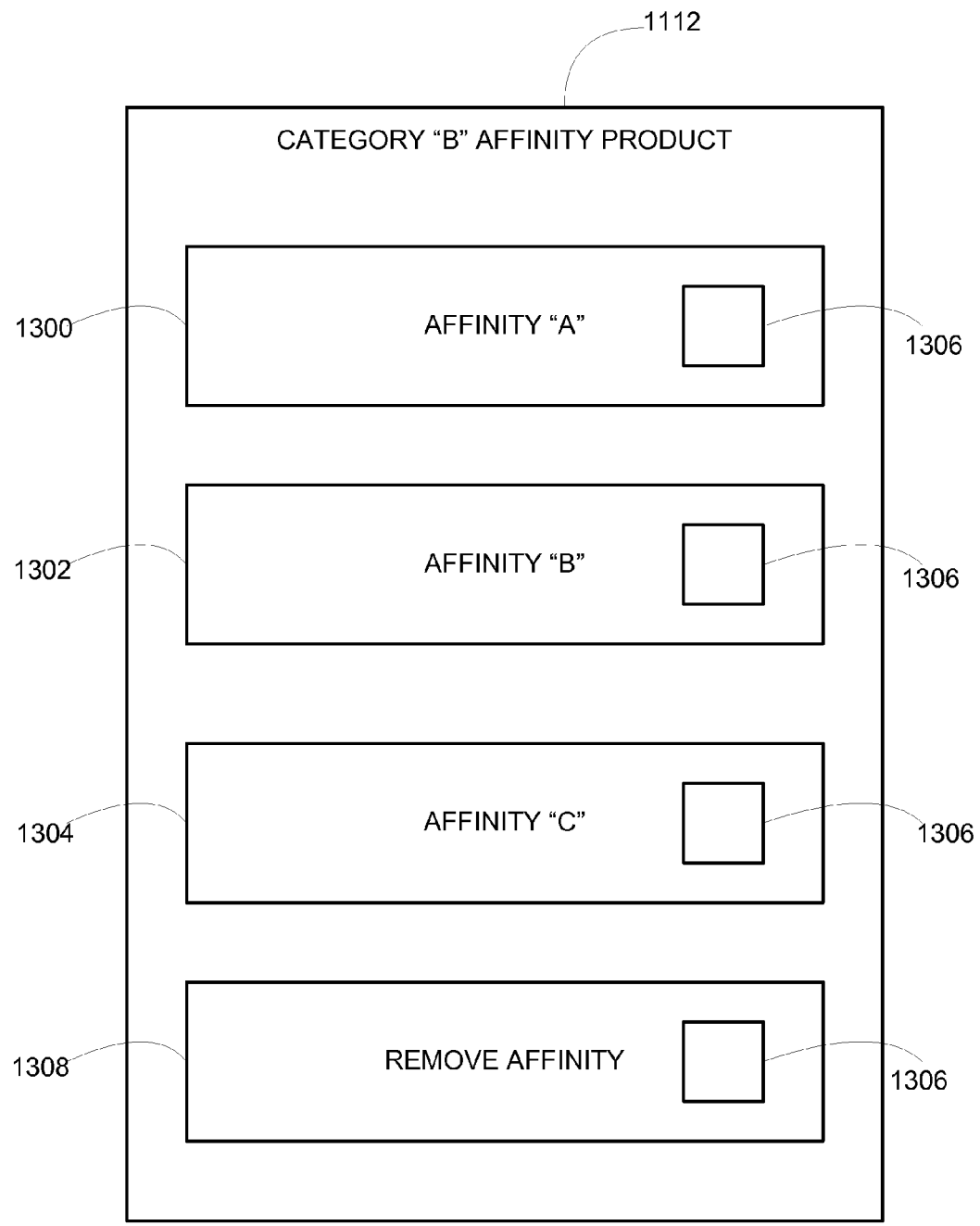
Figure 19:
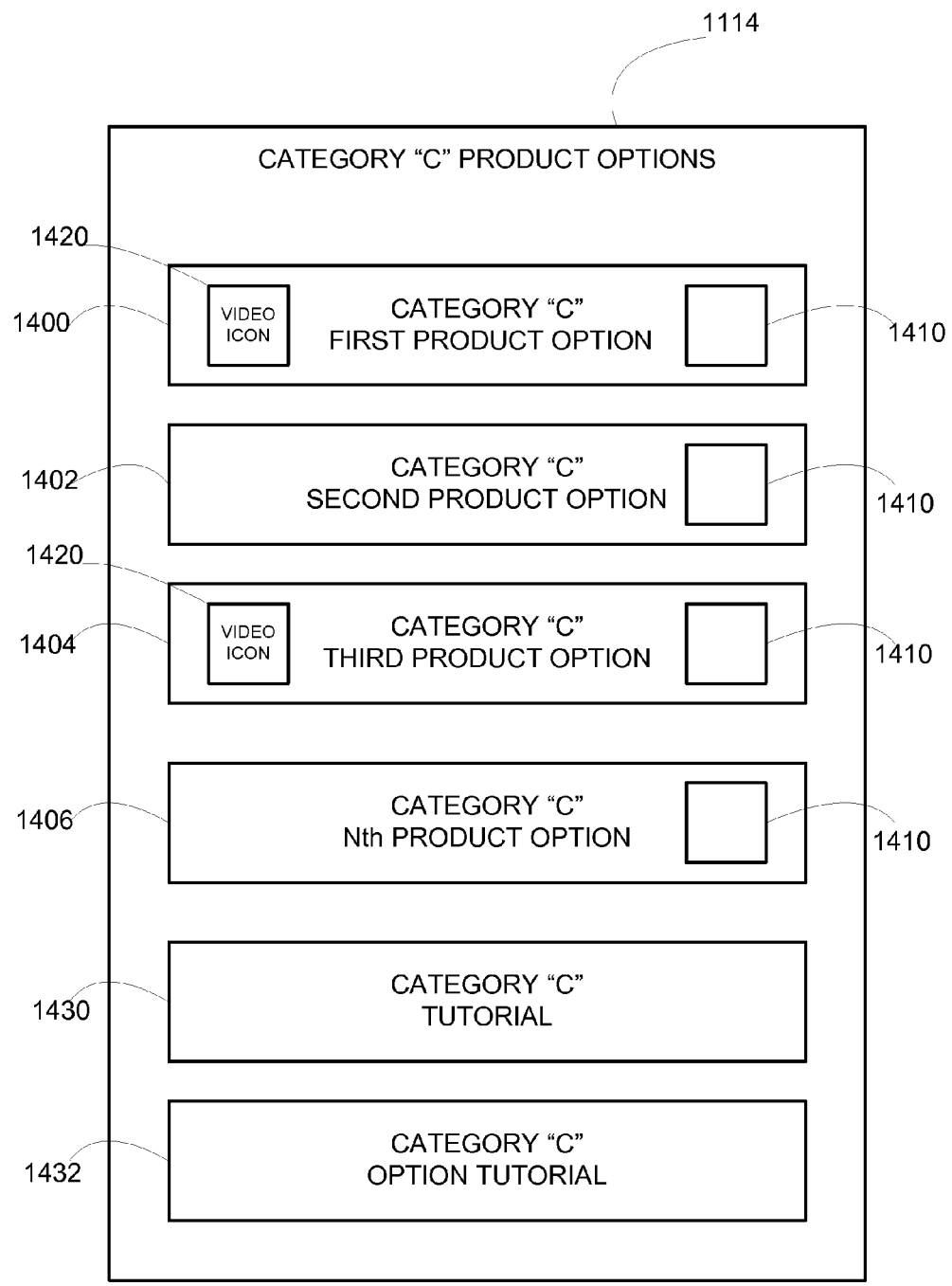
Figure 20:
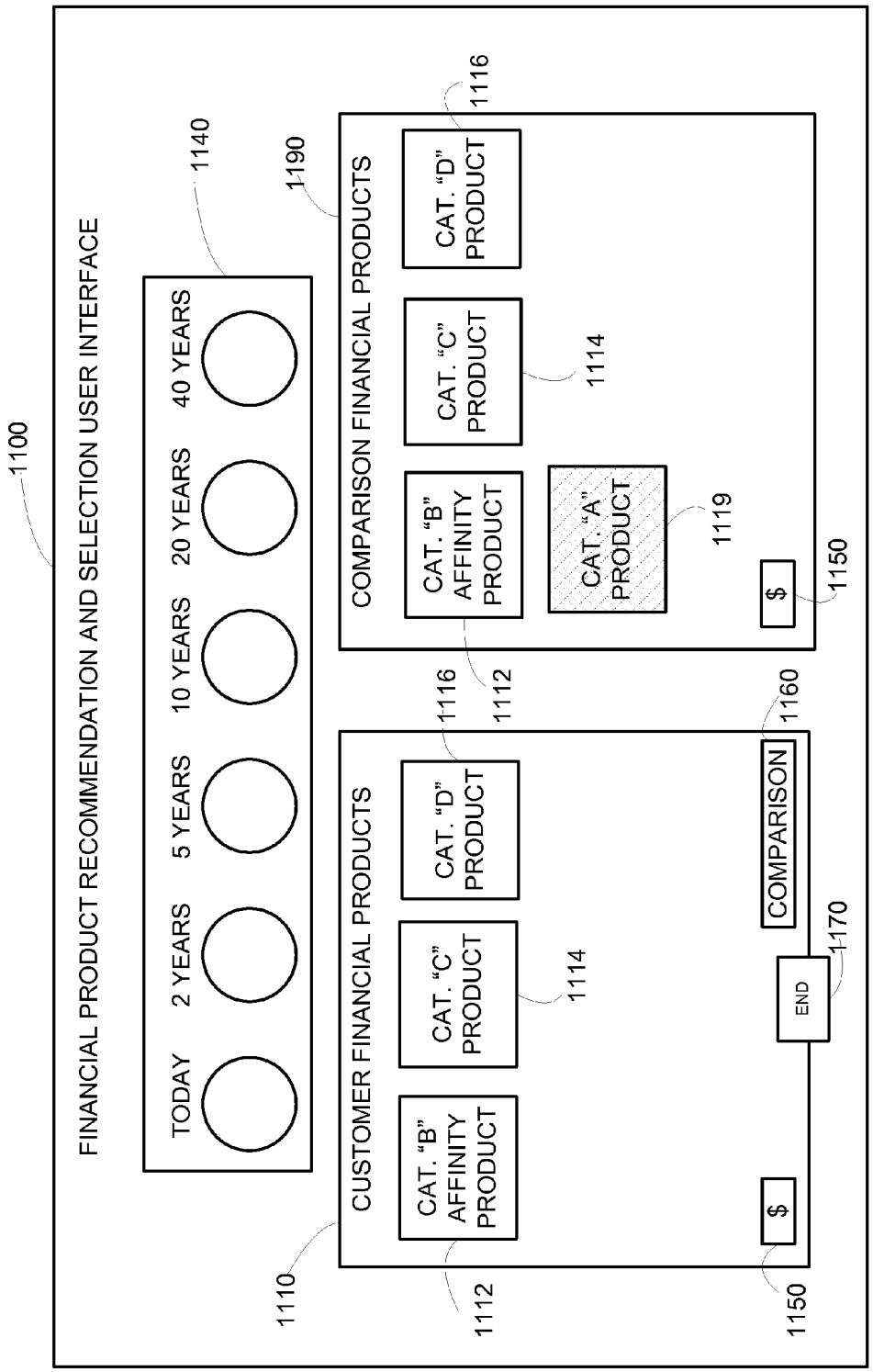
Figure 21:
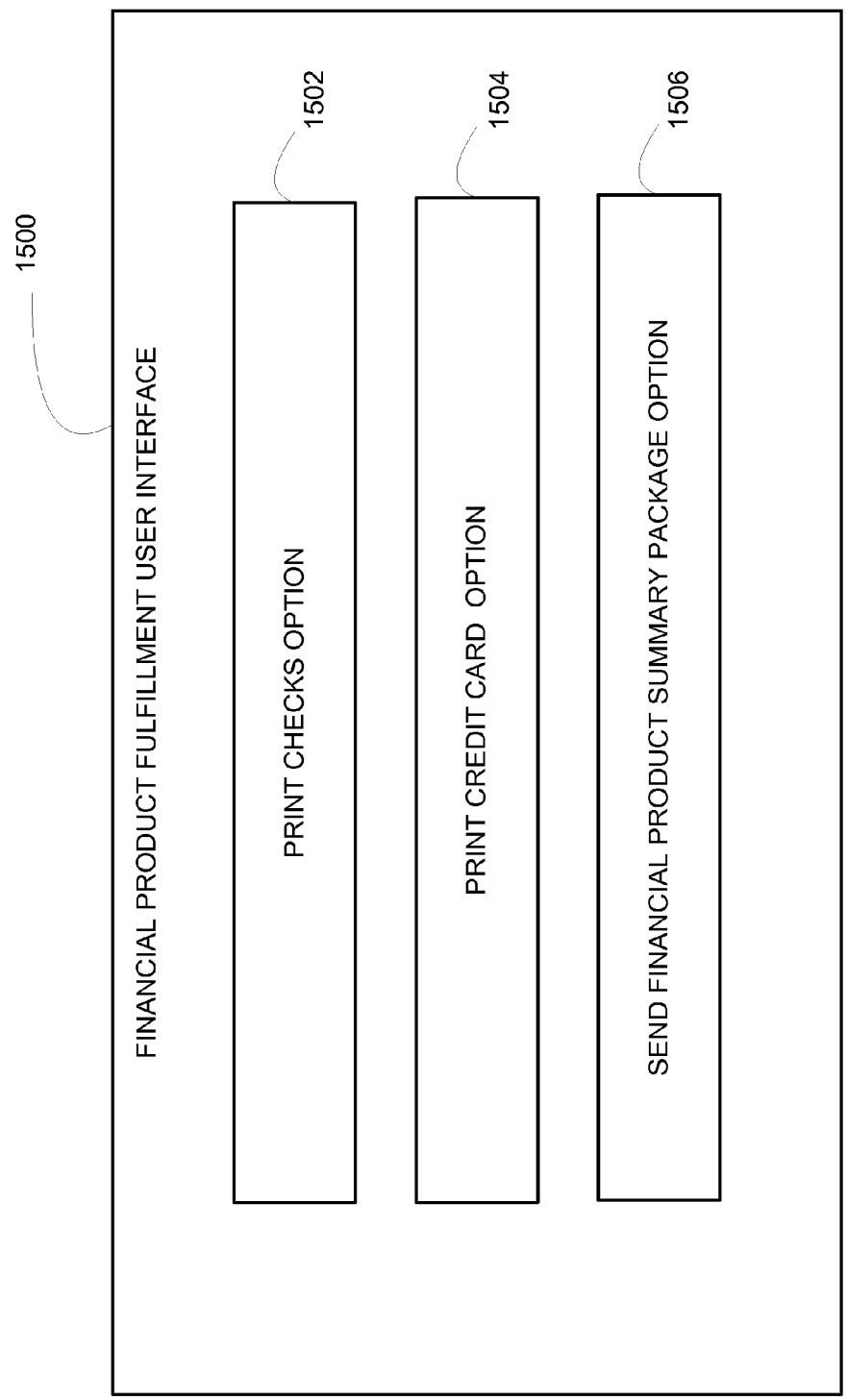
Figure 22:
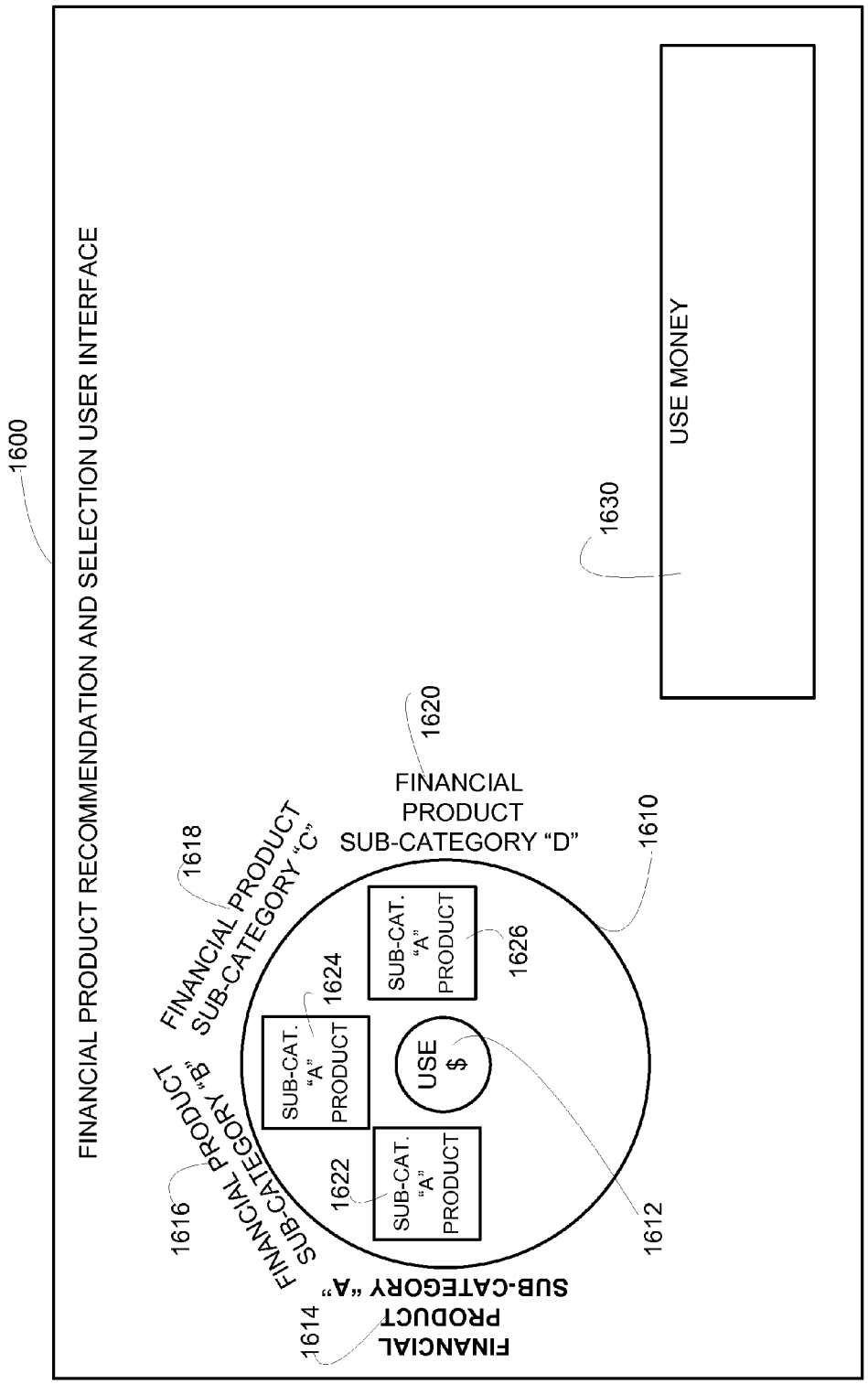
Figure 23:
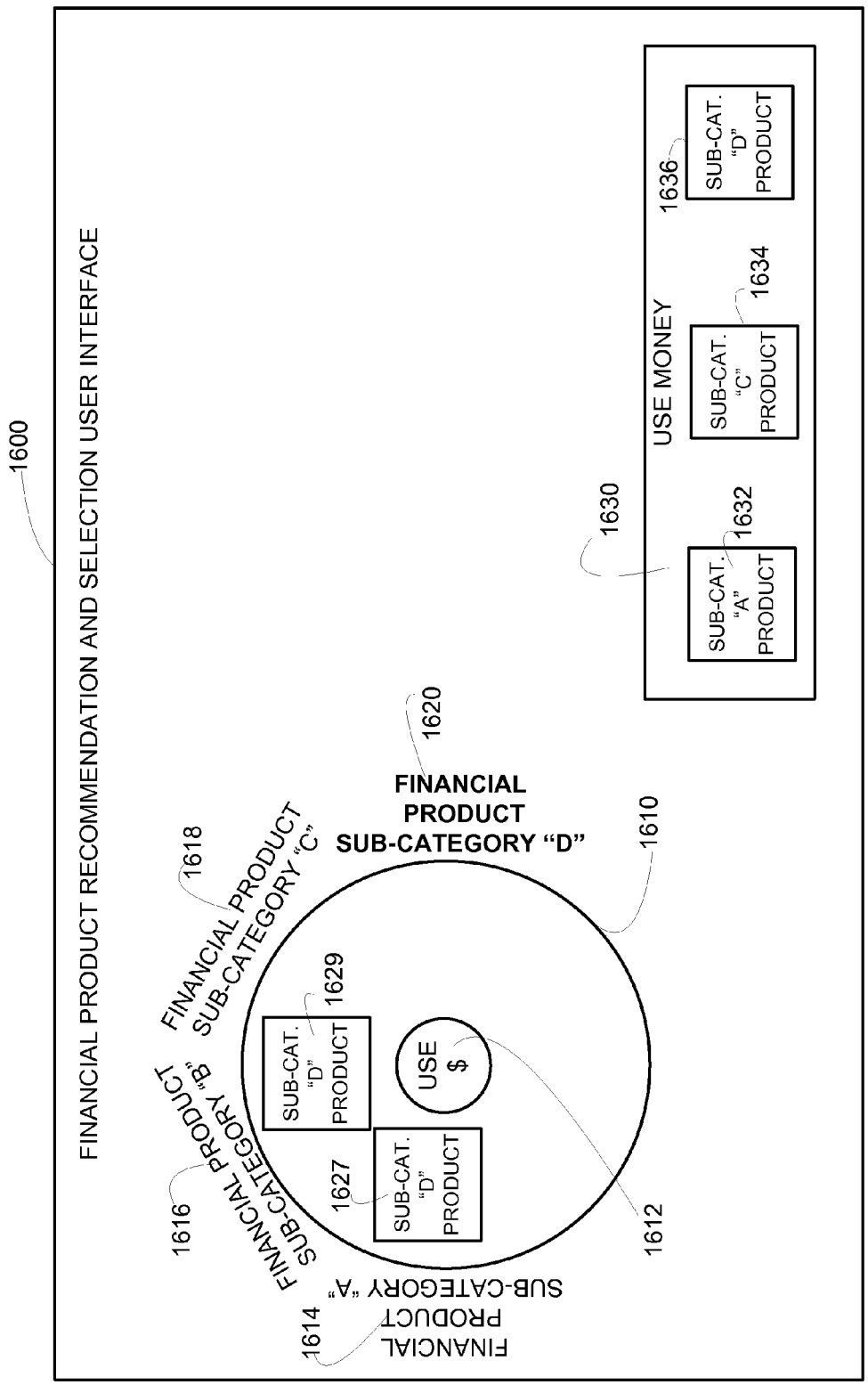
Figure 24:
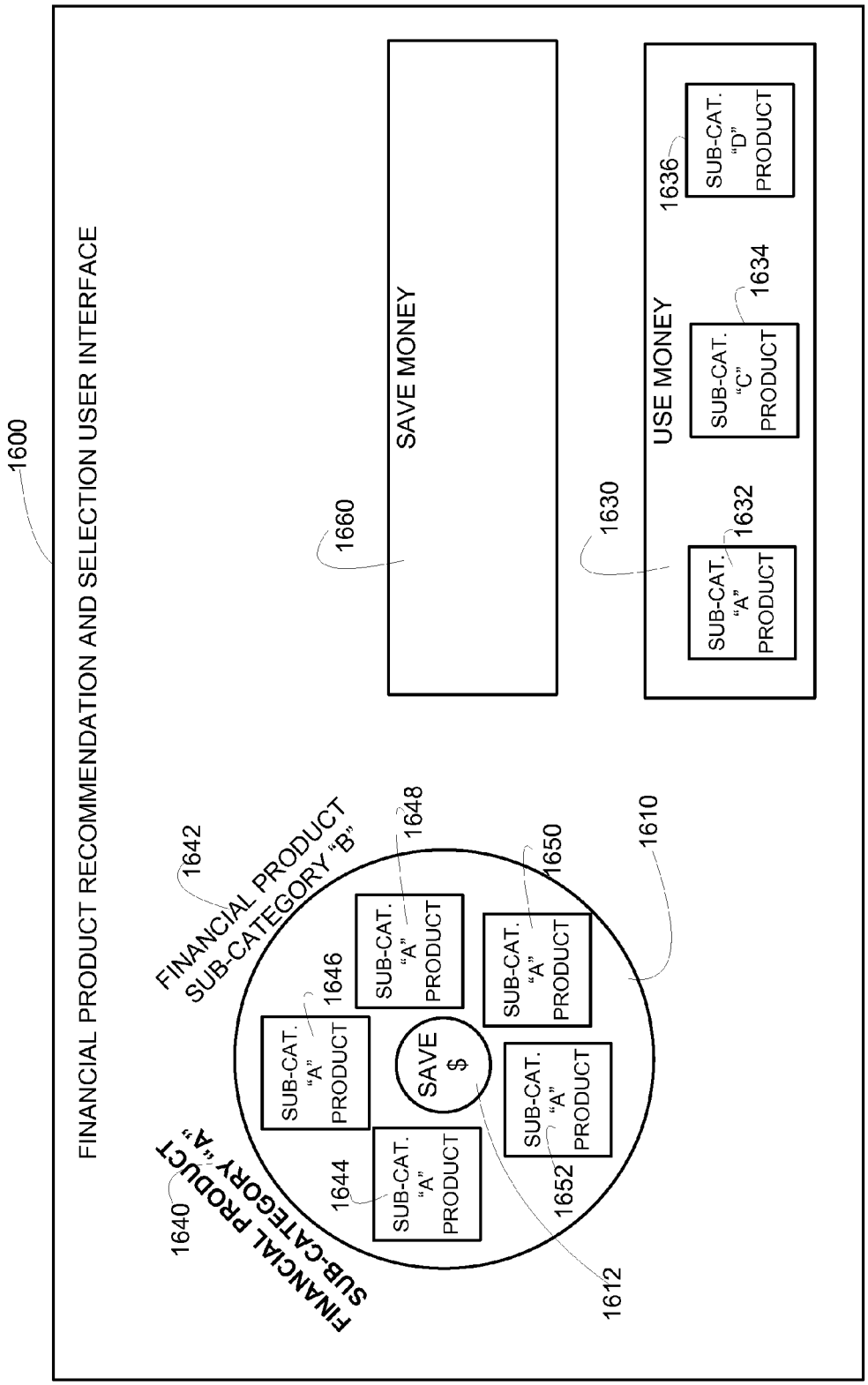
Figure 25:
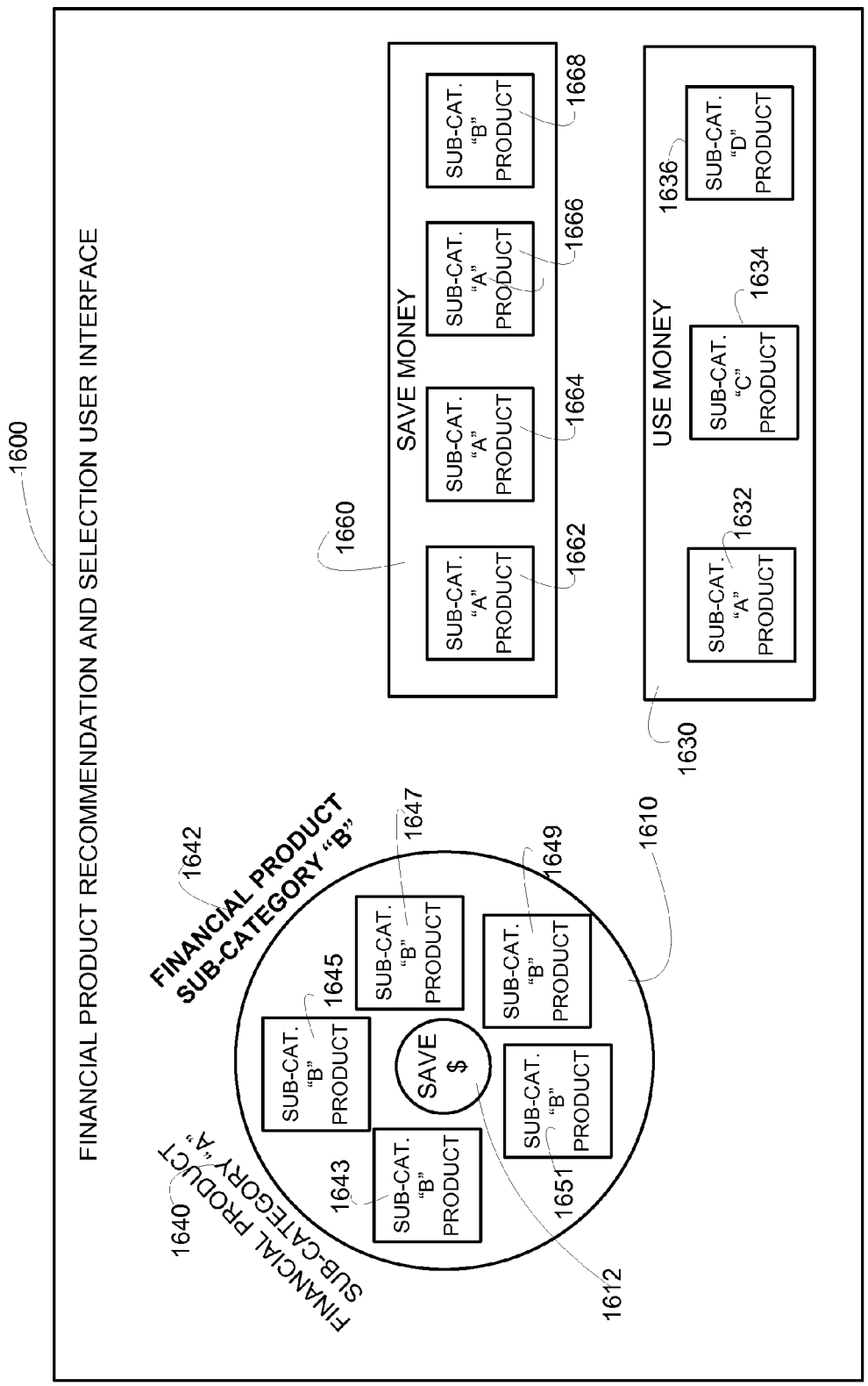
Figure 26:
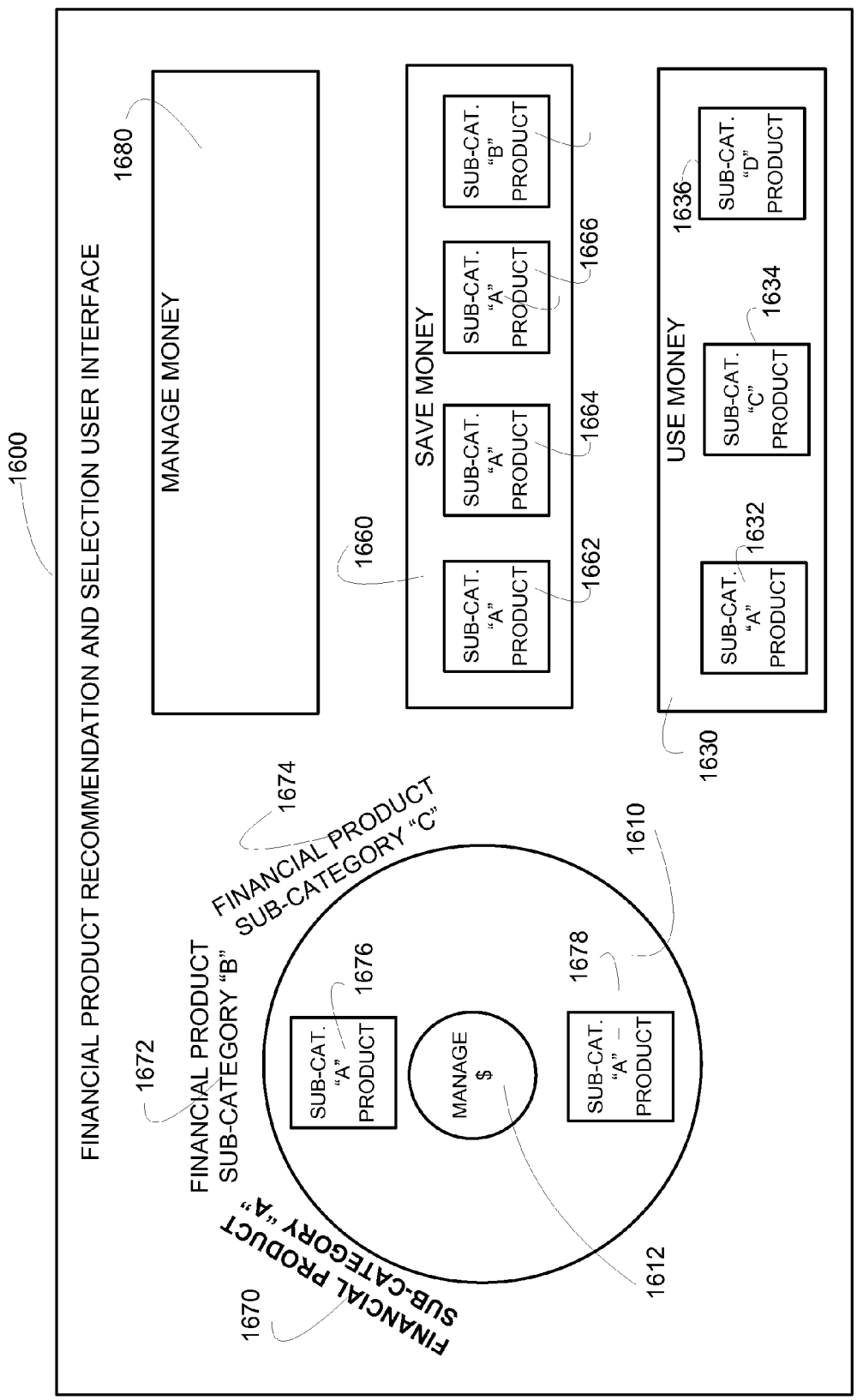
Figure 27:
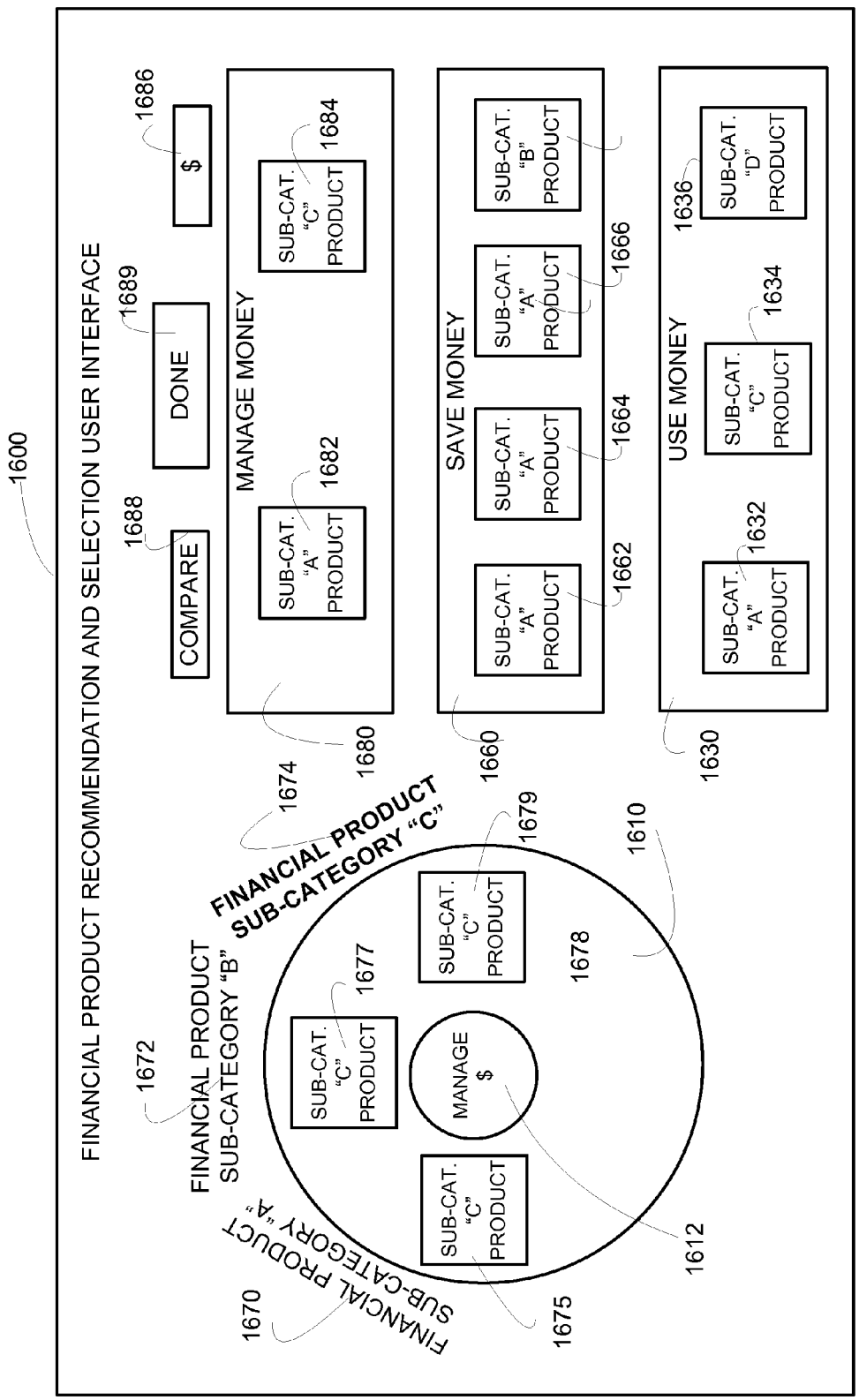
Figure 28:
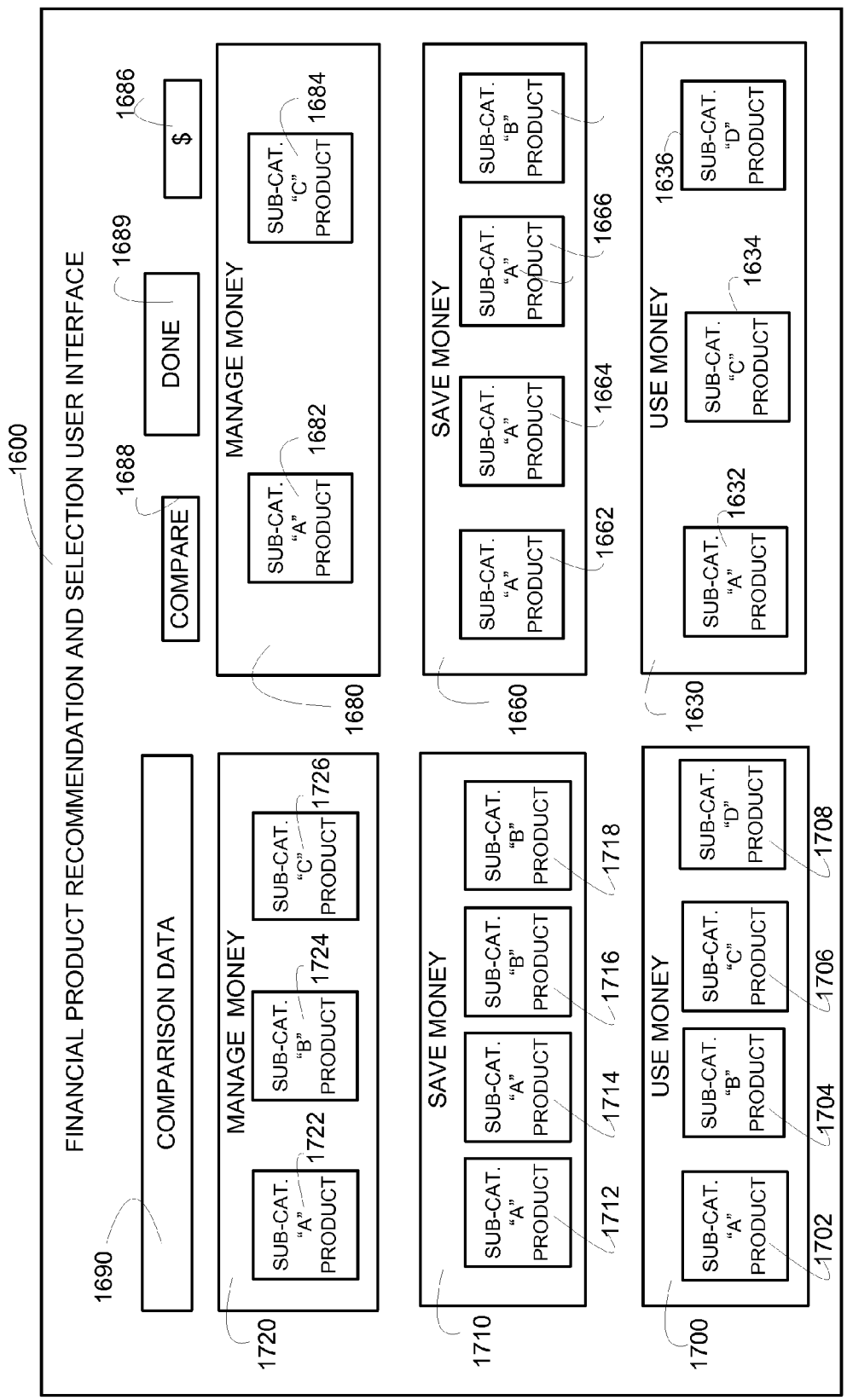

Having thus described embodiments of the invention in general terms, reference will now be made to the accompanying drawings, which are not necessarily drawn to scale, and wherein:

FIG. 1 is a flow diagram illustrating a method for providing financial solution recommendations, in accordance with one embodiment of the present invention;

FIG. 2 is block diagram of a financial solution recommendation module, in accordance with one embodiment of the present invention;

FIG. 3 is a block diagram of another configuration of a financial solution recommendation module, in accordance with an embodiment of the present invention;

FIG. 4 is a block diagram of a system for providing an interactive and collaborative financial solution recommendation platform, in accordance with one embodiment of the present invention;

FIGS. 5-7 illustrate examples of a life event user interface, according to another embodiment of the present invention;

FIG. 8 and FIG. 9 illustrate examples of a life interest user interface, according to a further embodiment of the present invention;

FIGS. 10-14 illustrate examples of a financial portfolio user interface, according to another embodiment of the present invention;

FIG. 15 and FIG. 16 illustrate examples of a financial product recommendation and customization user interface, according to another embodiment of the present invention;

FIG. 17 illustrates an example of an affinity financial product summary, according to another embodiment of the present invention;

FIG. 18 illustrates an example of an affinity financial product affinity change option presentation, according to another embodiment of the invention;

FIG. 19 illustrates an example of a financial product option selection and multi-media access presentation, according to another embodiment of the invention;

FIG. 20 illustrates another example of a financial product recommendation and customization user interface that highlights product selection comparison, according to another embodiment of the invention;

FIG. 21 illustrates an example of a financial product fulfillment user interface, according to yet another embodiment of the present invention;

FIG. 22 is a block diagram representation of an alternate financial product recommendation and customization user interface highlighting the use money category, in accordance with an embodiment of the present invention;

FIG. 23 is a block diagram representation of a financial product recommendation and customization user interface highlighting the selection of products in the use money category, in accordance with an embodiment of the present invention;

FIG. 24 is a block diagram representation of a financial product recommendation and customization user interface highlighting the save money category, in accordance with an embodiment of the present invention;

FIG. 25 is a block diagram representation of a financial product recommendation and customization user interface highlighting the selection of products in the save money category, in accordance with an embodiment of the present invention;

FIG. 26 is a block diagram representation of a financial product recommendation and customization user interface highlighting the manage money category, in accordance with an embodiment of the present invention;

FIG. 27 is a block diagram representation of a financial product recommendation and customization user interface highlighting the selection products in the manage money category, in accordance with an embodiment of the present invention; and FIG. 28 is a block diagram representation of a financial product recommendation and customization user interface highlighting the comparison between selected financial products and comparison data for individuals with similar demographics, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for an interactive and collaborative customer solution recommendation tool/module for marketing financial products, services and related offers (collectively referred to herein as "financial solutions") to customers. According to embodiments of the present invention, customers are able to dynamically build financial solution recommendations based on received inputs. These inputs, which may be received from the customer, an associate collaborating with the customer or from a customer database, may include customer behaviors, customer attitudes, customer life events, customer life interests, customer personal/profile data, customer financial data, such as portfolio data and the like. Based on the received inputs, financial solution recommendations are determined and presented to the customer in real time or near time to received input. As such, the customer is able to instantaneously see how each input of data impacts the financial solution recommendations allowing the customer to have transparency to the exchange of value. Further, embodiments of the present invention provide for inputs to the financial solution recommendation tool/module to be received in a non-linear fashion, such that a customer or a collaborating associate may enter the tool/module at various different entry points and provide associated inputs based on the financial solution needs and desires of the customer.

Referring to FIG. 1, a flow diagram is depicted of a method 100 for dynamically providing financial solution recommendations to a customer, according to an embodiment of the present invention. It should be noted that the term "customer" as used herein refers to an existing customer and a potential customer. At Event 110, a plurality of inputs is received that define criteria for recommending financial solutions.

In specific embodiments of the invention, the inputs define or are otherwise relate to at least one of customer financial behavior, customer financial attitude, customer life events, customer life interests, customer personal data, customer financial portfolio data or the like. As described in more detail below, the customer financial behaviors include, but are not limited to, banking preferences (i.e., how the customer banks, where the customer banks and the like), spending/purchasing preferences (i.e., the form of payment used by the customer for purchases/spending and the like) and the like. Customer financial attitudes include, but are not limited to, financial security attitude (i.e., the willingness of the customer to bank at an Automated Teller Machine (ATM), online or the like), financial institution attitude (i.e., the customer's attitude toward financial institution services/products, the customer's attitude toward the financial institution as a whole), how engaged the customer is with their finances and the like. Customer life events may be any previous, current or future event associated with the customer that may impact the customer's financial situation. Customer life events may include, but are not limited to, education, weddings, retirement and the like. Customer life interests may be any interest that the customer has which may impact the financial solution recommendations (e.g., affinity products that reflect a life interest). Examples of customer life interests include, but are not limited to, universities/colleges, professional sports teams, organizations/clubs, hobbies and the like. Customer financial portfolio data includes the current customer financial holdings, such as deposit account balances, real estate holdings, mortgage accounts, investment accounts and the like.

In addition, in other specific embodiments, the inputs may be received from a customer, a financial institution associate or from a customer database. In this regard, a customer may interface with a network-based financial recommendation module/tool, such as an Internet-based module/tool, a mobile application-based module/tool, a kiosk/ATM-based module/tool or the like. In addition, in a financial institution setting a customer may collaborate with a financial institution associate, such that questions are posed to the customer and the financial institution associate enters the inputs into the module/tool. In other embodiments, inputs may be received or otherwise derived from customer data stored in a customer database. The customer database may be a database of the financial institution implemented the financial solution recommendation module/tool or the database may be a third party database that includes data other than data specific to the financial institution implementing the financial solution recommendation module/tool. The customer data used as inputs or used to derive inputs may include, but is not limited to, profile data, account data, transaction data or the like.

In other specific embodiments the inputs may be received in a non-linear manner. In this regard, the financial solution recommendation module/tool is configured with multiple data entry points for the purpose of allowing the customer or financial institute associate to provide specific inputs that are associated with the financial solution recommendation desired or needed by the customer. For example, if the customer only desires a checking account, the customer may access the module/tool at the entry point associated with checking account recommendations and provide the inputs needed or suggested to determine checking account recommendations.

At Event 120, one or more financial solution recommendations are determined, each time one or more inputs are received, based on the current inputs received. "Financial solution recommendations" as used and claimed herein include financial products, financial services, financial programs, offers related to the same and the like. In addition, for the purposes herein described and claimed the term "determined" includes determine new financial solution recommendations as well as making changes to existing financial solution recommendations. In this regard, as inputs are received and accumulated they form the basis for making financial solution recommendation determinations or making changes to existing financial solution recommendations. In certain instances, a specific single input may cause a financial solution recommendation to occur or a change to an existing financial solution recommendation, while in other instances a specific single input may not cause a financial solution recommendation to occur or a change to be made but the criteria associated with the input may be used in combination with other inputted criteria to subsequently determine a financial solution recommendation or a change to an existing financial solution recommendation.

At Event 130, the one or more financial solution recommendations are provided to a user interface in real-time or real time to receiving an input. The user interface may be a display associated with a computing device being used by a customer or a display associated with a computing device at a financial institution, at which the customer and a financial institution associate are collaborating on the financial solutions. The dynamic nature of determining the financial solution recommendations allows for the recommendation to be provided in real-time or near real-time at the user interface. As such, the customer can immediately comprehend the affect that an input has on their financial solution recommendations and can immediately respond with other inputs. (i.e., other responses to the queries posed) to change or otherwise alter the financial solution recommendations to meet the customers needs or the like.

In addition, one or more financial solution-customization inputs may be received based on the one or more financial solution recommendations provided in the user interface. The solution-customization inputs provide for financial solutions other than the ones recommended via the module/tool based on the inputs to be provided at the user interface for the purpose of comparing the other financial solutions to the recommended financial solutions. In the event that a financial solution-customization input conflicts with a previous input, a notation is provided to the customer that serves to alert the customer of the conflict between the chosen solution-customization input and the previously entered input. For example, if the customer provides an input that indicates they do not desire to bank electronically, the financial solution recommendation may be a solution that requires a minimum balance qualifier. As such, the solution-customization input received from the customer for comparison purposes may be for electronic banking In which case, a notation is provided alerting the customer that the selection of electronic banking is in conflict with earlier inputted criteria.

Turning the reader's attention to FIG. 2, a block diagram is depicted of a customer solution recommendation module 300 that is operable for providing a platform for recommending and customizing a customer's financial product needs based on one or more criteria, in accordance with an embodiment of the present invention. The customer solution recommendation module 300 includes various user interface routines operable for providing a user interface, such as graphical user interface (GUI) or the like, for the user to enter related recommendation criteria and receive financial solution recommendations. The user interface routines shown and described in relation to FIG. 2 are specific to the type of recommendation criteria, however in other embodiments, such as shown in FIG. 3, the user interface routines may be specific to a specific financial product or service. In addition, the routines shown in FIG. 2 are by way of example only and, as such, other embodiments of the invention may include less or more routines identified by other types of recommendation criteria.

Customer financial behavior and customer financial attitude user interface routine 310 is configured to receive financial behavior inputs 312 and financial attitude inputs 312 that define a customer's financial behaviors and/or attitudes. As previously noted, the customer financial behaviors and/or attitudes may include, but are not limited to, banking preferences, spending/purchasing preferences, financial security attitude, financial institution attitude and the like. Based, at least in part, on one or more of the inputs 312, 314 one or more financial solution recommendations 350 are determined for the customer, which may include financial products, financial services, financial programs, offers related to the same and the like. In addition, the financial solution recommendations 350 may be based on other inputs received from other routines in the module tool and/or data retrieved from a customer database.

In specific embodiments, in which multiple financial behavior or financial attitude inputs are received, the various inputs may result in determination of a financial solution recommendation that conflicts with one or more of the inputs. In such instances the conflicting input is flagged, such that a "best fit" financial solution recommendation that is determined for the customer includes notation that the financial solution does not meet the conflicting criteria. For example, if the customer provides an input that they do not want paperless statements (i.e., they prefer statements to be mailed) and, also provides an input they desire to bank electronically, which provides for paperless statements (i.e., conflicts with the previous input), the determined "best fit" financial solution recommendation provided to the customer may be electronic banking with notation that this recommended solution does not provide for paperless statements, absent minimum account balances or a fee.

Life event user interface routine 320 is configured to receive life event inputs 322. A life event alone may define input 322 or, in other embodiments, a date or date range associated with the life event may be included in input 322. In specific embodiments of the invention, the user interface provided by routine 320 includes a timeline, such that life events may be associated with a date or date range within the timeline to input a life event and define the proximate date of occurrence of the life event. The life events may include, but are not limited to, home purchases, mortgage payoff, education, wedding, birth of children, retirement and the like. Based, at least in part, on one or more of the inputs 322 one or more financial solution recommendations 350 are determined for the customer, which may include financial products, financial services, financial programs, offers related to the same and the like. In addition, the financial solution recommendations 350 may be based on other inputs received from other routines in the module tool and/or data retrieved from a customer database.

The financial solution recommendation module 300 may additionally include life interest user interface routine 330 that is configured to receive life interest inputs 332 that define a customer's life interests. Life interests may be advantageous in determining which affinity products or services to recommend to the customer, such as affinity debit/credit cards, affinity checks or the like. The life interests may include, but are not limited to, universities/colleges, professional sports teams or participants, clubs/organizations, hobbies or the like. Based, at least in part, on one or more of the inputs 332 one or more financial solution recommendations 350 are determined for the customer, which may include financial products, financial services, financial programs, offers related to the same and the like. In addition, the financial solution recommendations 350 may be based on other inputs received from other routines in the module tool and/or data retrieved from a customer database.

In addition, the financial solution recommendation module 300 may additionally include financial portfolio user interface routine 340 that is configured to receive financial portfolio inputs 342 that define a customer's current financial interests. These inputs 342 may be received from the customer or financial associate based on queries posed to the customer or they may be received or derived from customer information stored in a customer database. The financial portfolio information may include, but are not limited to, deposit account balances, investment account balances, loan balances, mortgage balances, investment assets, real estate assets and the like. Based, at least in part, on one or more of the inputs 342 one or more financial solution recommendations 350 are determined for the customer, which may include financial products, financial services, financial programs, offers related to the same and the like. In addition, the financial solution recommendations 350 may be based on other inputs received from other routines in the module tool and/or data retrieved from a customer database.

As previously noted, FIG. 3, is a block diagram depiction of a customer solution recommendation module 300 that is operable for providing a platform for recommending and customizing a customer's financial product needs based on one or more criteria, in accordance with an embodiment of the present invention. The customer solution recommendation module 300 includes various user interface routines operable for providing a user interface, such as graphical user interface (GUI) or the like, for the user to enter related recommendation criteria and receive financial solution recommendations. The user interface routines shown and described in relation to FIG. 3 are specific to financial institution product or service type. Such an embodiment is highly advantageous in allowing the customer or financial associate to provide inputs in a non-linear manner based on the customers needs. The customer can access the user interfaces related to their specific financial product or service types of interest, provide the necessary inputs and be provided with financial solution recommendations for those particular products or services without having to sequentially complete each and every section of the module 300.

Thus, the module 300 shown in FIG. 3 includes financial product/service type "A" user interface routine 370 which may associated with any financial product or service offered by the financial institution. In specific embodiments, the module 300 may include a user interface for selecting one of broad category, such as banking, investing or borrowing, which, upon customer selection, allows the customer to select specific product types. For example, the banking category may include a checking account user interface routine a savings account user interface routine, debit/credit card user interface routine and the like. The investing category may include an individual retirement account user interface routine, a securities user interface routine and the like. The borrowing category may include a mortgage user interface routine, a home equity user interface routine, a personal line-of-credit user interface routine or the like. In other embodiments, routines may reflect financial product and services typically procured by commercial customers as opposed to personal/individual customers.

Financial product/service type "A" user interface routine 370 includes one or more inputs, such as financial behavior input 312, financial attitude input 314 life event input 322, life interest input 332, financial portfolio input 342 and the like. It should be noted that for any one particular financial product/service type user interface not all of the different types of recommendation criteria inputs will be included in the user interface for each product/service type. Moreover, in certain instances only one type of recommendation criteria inputs may be included in a particular financial product/service type user interface.

Additionally, the financial solution recommendation module 300 may optionally include a financial portfolio user interface routine 330 operable to provide a user interface, such as a displayable graphical user interface, suitable for inputting financial portfolio information. As previously noted, in one specific embodiment, the financial portfolio user interface routine 330 may provide for a user interface that includes a scrollable catalog of financial institutions categories, with each financial institution category allowing for the user to denote use of the financial institution and assess the value of any asset accounts or liability accounts associated with the specific financial institutions.

The financial solution recommendation module 300 additionally includes a financial product recommendation and customization user interface routine 340 operable to provide a user interface, such as a displayable graphical user interface, suitable for providing financial product recommendations based at least in part on the customer's life events and associated proximate dates of the life events and, in some embodiments, the life interests and/or the financial portfolio information. In addition to providing the financial product recommendations, the user interface may provide for customization of a desired financial product package based on additional financial options presented to the user on the user interface. The additional financial product options may be based at least in part on the customer's life events and associated proximate dates of the life events and, in some embodiments, the life interests and/or the financial portfolio information.

It should be noted that while FIG. 3 depicts the user interfaces as being separate entities, the functionality and/or operability of two or more user interfaces may be combined in a single user interface, such that a single display may be provided to allow input of more than one customer information category. For example, a single graphical user interface display may provide for user input of a life event, life interest and financial portfolio information. Additionally, it is contemplated and within the confines of the inventive concepts that all of the user interfaces herein described may be combined in a single graphical user interface display. In such a configuration, it may be possible to provide the user inputs of life event, life interest and financial portfolio information and financial product recommendation and customization platform in a single graphical user interface display. Based, at least in part, on one or more of the inputs 312, 314, 322, 332 342, one or more financial solution recommendations 350 are determined for the customer, which may include financial products, financial services, financial programs, offers related to the same and the like. In addition, the financial solution recommendations 350 may be based on other inputs received from other routines in the module tool and/or data retrieved from a customer database.

The module 300 of FIG. 3 additional includes financial product/service type "Z" user interface routine 380 which is shown to illustrate the fact that the module 300 may include a multitude of financial product/service type user interface routines depending on the products and services offered by the financial institution or the like. In certain embodiments, the module 300 may be configured to be limited to a certain subset of the products or services offered by the financial institution and, in one specific embodiment, the module 300 may be configured to provide recommendations and selection of only one financial product or service type.

Referring to FIG. 4, a block diagram is representative of a system 400 for providing financial solution recommendations to a customer, in accordance with another embodiment of the present invention. The system may include a user computing device 410, a financial institution server device 500, a computing database 600, and a customer sales/service server 700. It should be noted that the devices shown and described in the system are by way of example only and the functionality shown in these devices may reside on one or more other devices or be consolidate to one of the devices shown. The system 400 is operable to provide the financial solution recommendation platform to the customer and/or financial institution associate via the user computing device 410. The user computing device may be a device associated with the customer such as, a personal computer, a laptop computer, a mobile computing device (e.g., smart phone or the like). In such instances the customer may have networked access, such as the Internet or the like, to the financial solution recommendation module 300 via the computing device. In other instances, the user computing device 410 may be an ATM, a financial institution kiosk or other device in the control of the financial institution. In still further instances, the user computing device 410 may be a personal computer, laptop computer of the like located at the financial institution center (e.g., at a banking center) or the like.

The user computing device 410, as shown includes, a computing platform 42 having one or more user interfaces 430, such as a display, keypad/keyboard or the like, a processor 440 and a memory 450. The computing platform 420 is configured to transmit data across a wired or wireless network, and can receive and execute routines and applications. Computer platform 420 includes memory 450, which may comprise volatile and non-volatile memory such as read-only and/or random-access memory (RAM and ROM), EPROM, EEPROM, flash categories, or any memory common to computer platforms. Further, memory 450 may include one or more flash memory cells, or may be any secondary or tertiary storage device, such as magnetic media, optical media, tape, or soft or hard disk.

Further, computing platform 430 also includes at least one processor 440, which may be an application-specific integrated circuit ("ASIC"), or other chipset, processor, logic circuit, or other data processing device. Processor 440 may include various processing subsystems (not shown in FIG. 4) embodied in hardware, firmware, software, and combinations thereof, that enable the functionality of computing device 410 and the operability of the computing device 410 on a network. For example, processing subsystems may allow for initiating and maintaining communications, and exchanging data, with other networked devices.

Server device 500 includes computing platform 510 having at least one processor 530 and a memory 520 in communication with the processor 530. The memory 520 of server device 500 includes the financial solution recommendation module 300 shown and described in relation to FIGS. 2 and 3. The financial solution recommendation module 300 is operable to provide a platform for recommending and customizing a customer's financial product needs based on one or more criteria. While in the illustrated embodiment of FIG. 4 the module 300 is shown as being stored at server device 500 and network accessible to user computing devices 410 (e.g., a cloud computing environment) In other embodiments of the invention the module 300 or portions of the module may reside and be executed at the user computing device 410 level.

The system 400 may also include a customer database 600 that is operable to store a plurality of customer profiles 610. The customer profiles 610 may include entries for behavior/attitude data 620, life events and associated occurrence date 630, life interest data 640, financial portfolio data 650 and financial products/service data 660 that the customer has selected/purchased or otherwise shown an interest in. The customer profiles may be relied upon by the customer product/service comparison module 720 to determine what financial product packages have been selected by customers with similar life events, life interests, financial portfolios and/or demographics as the customer of note.

In addition, the customer profile 610 may be relied upon to re-evaluate the customer's financial product needs over time. In this regard, triggers may be set to contact the customer at appropriate points-in-time based on the proximate date associated with a defined life event. For example, the financial institution may contact the customer prior to a date associated with a major purchase to determine if the purchase is still planned and if financing is necessary to undertake the major purchase. If the purchase is imminent and financing is necessary, the financial institution can offer products or services related to the major purchase and/or the financing of the major purchase. In another example, the financial institution may contact the customer prior to a date associated with the beginning of a family member's college education to determine if funding of the education is necessary and, if so, provide offers for products or services related to college education funding.

The triggers in the customer profile 610 may prompt automated customer contact, such as automated telephone calls, automated electronic mail (i.e., e-mail), automated mailings or the like. In other embodiments, the triggers in the customer profile 610 may prompt manual customer contact, such as personal telephone calls, face-to-face contact or the like.

The system may additionally include a customer sales/service server 700 that includes a customer product/service comparison module 710 operable to determine a comparison package of financial products for the customer. The comparison package may be based on financial behaviors, financial attitudes, the life events of the customer, the financial portfolio of the customer or other demographic information provided by the customer. In one embodiment, the comparison package may be operable to show what customers of similar demographic background/life events/financial background have previously purchased or otherwise assembled as their particular financial product package. Thus, the customer product/service comparison module 710 may be in networked communication with databases, such as customer database 600 or the like, to determine the financial product packages of other customers. Access to the comparison package information may be provided to the customer via an option within the financial solution recommendation module 300. It should be noted that while the customer financial product/service comparison module 710 is shown as being executed on the customer sales/service server 700, in other embodiments it may be feasible and conducive to store and execute the customer product/service comparison module 710 on the server device 500.

The customer sales/service server 700 may additionally include a customer affinity offer determination module 730 operable to determine one or more affinity options for recommended financial products based on the customer's life interest inputs provided for by the life interests user interface routine 320 of the financial solution recommendation module 300. It should be noted that, while the customer affinity offer determination module 720 is shown as being executed on the customer sales/service server 700, in other embodiments it may be feasible and conducive to store and execute the customer affinity offer determination module 720 on the server 500 or configure the financial solution recommendation module 300 to include such functionality.

FIGS. 5-21 represent graphical user interfaces associated with one specific embodiment of the present invention. It should be noted that the illustrations shown and described in FIGS. 5-21 are not to be deemed limiting in any way, but rather, show and describe one embodiment for practicing the present invention. Other specific embodiments of the graphical user interfaces and the module itself are contemplated and within the scope of the inventive concepts herein disclosed.

FIGS. 5-7 depict a block diagram representation of a life event user interface 800 configured for inputting life events and the proximate date associated with the occurrence of each life event. The life event user interface 800 includes life event tags 810 that define a specific life event. A life event for the purposes of this invention may be any event in the life of a customer that is generally associated with a change in financial status, requires financing, and/or requires financial assessment/planning Examples of life event tags shown in FIGS. 5-7 include a "home purchase"/own home tag 812, a "retirement" tag 814, a "have children" tag 816, a "college"/higher education tag 818, a "debt free" tag 820, a "move"/relocate tag 822, a "major purchase" tag 824, a "job change" tag 826, a "save money" tag 830 and other event tag 828. Although not shown in FIGS. 5-7, it is possible to configure the life interest user interface 800 such that the life event tags are scrollable, thereby allowing additional life event tags that define other life events to be displayed and selected by the customer.

The life event user interface 800 additionally includes a timeline 850. In the illustrated example of FIG. 5, the timeline 850 includes a plurality of timeline buckets 850 that represent a date or a range of dates. For example, FIGS. 5-7 depict a current timeline bucket 850A, a "within 2 years" timeline bucket 850B, a "within 5 years" timeline bucket 850C, a "within 10 years" timeline bucket 850D, a "within 20 years" timeline bucket 850E and a "within 40 years" timeline bucket 850F. Thus, the "within 2 years" timeline bucket 850B accounts for a two-year range, the "within 5 years" timeline bucket 850B accounts for a three-year range, the "within 10 years" timeline bucket 850B accounts for a five-year range, the "within 20 years" timeline bucket 850B accounts for a ten-year range, and the "within 40 years" timeline bucket 850B accounts for a 40-year range. The current timeline bucket 850A is for life events already achieved or life events currently ongoing.

As shown in FIG. 6, a user may move the life event tags from the life event tags 810 area to one of the timeline buckets 850. In doing so, the user has inputted a life event and defined an associated proximate date for the occurrence of the life event. Movement of the tags may be dictated by the form in which the user interface platform is presented. In one embodiment in which the user interface is presented on a conventional display, the life event tags 810 may be moved by mouse/pointer interaction through a click and drag function. In another embodiment in which the user interface is presented on a multi touch-screen display, the event tags 810 may be moved by appropriate finger motion, such as dragging an event tag toward a bucket or "flicking" an event tag toward a bucket. As shown in FIG. 6, the "own home" event tag 812 has been moved to the current timeline bucket 850A to signify a life event that has already occurred. Additionally, the "have children" event tag 816 and "debt free" event tag 818 have been moved to the "within 10 years" or 6-10 year range timeline bucket 850D. As event tags are moved to a timeline bucket, the bucket may expand in size to accommodate the size and/or volume of event tags in the timeline bucket. In this regard, the greater the number of event tags within a timeline bucket, the larger the perimeter of the timeline bucket.

In one embodiment of the life event user interface 800, a user may "point and click" or otherwise "tap and hold" an event tag once they are moved to a timeline bucket to provide for the display of a dropdown menu 860 that indicates the years within the range of the timeline bucket. The dropdown menu 860 allows the user to further define the specificity of the proximate date of occurrence of a life event, in instances in which the user can, and is willing to, provide such date granularity. Thus, if the current year is 2008 and the timeline bucket is the "within 10 years" or 6-10 year timeline bucket 850D, the dropdown menu 860 may reflect the years 2014, 2015, 2016, 2017 and 2018. As shown in FIG. 7, if the user selects a year from the dropdown menu 860, the year will be reflected in the event tag shown on the user interface and the year will define the proximate date of occurrence for the associated life event. By providing for further granularity within the timeline 850, such as specific years or the like, the financial solution recommendation system of the present invention is able to more closely align product/service recommendations and related offers to meet the needs of the customer. In addition, the customer profile that stores life events and the associated proximate date will reflect a more definitive date for the occurrence of the life event and, thus, triggers in the customer profile for contacting the customer will be more accurate in terms of the date of occurrence.

For example, in FIG. 7, the customer has chosen 2017 as the date 862 for which the customer desires to be debt-free. The date 862 is associated and displayed with the event tag and the timeline bucket may be re-sized to accommodate for the inclusion of the date within the event tag. During the life event evaluation process, if the customer desires to remove or change the year from an event, the customer may "point, click and drag" or "touch, drag and drop" the year portion of the event tag to accomplish removal of the date. A new date from within the date range of the timeline bucket may be added or the event tag may be moved to another timeline bucket within the user interface, if the customer deems necessary. Additionally, the same procedure may be used to remove an event tag from a timeline bucket. The user/customer may "point, click and drag" or "touch, drag and drop" the event tag to an area outside of the timeline bucket to remove the event from the timeline. Once the event has been removed from the timeline, it may re-appear in the life event tag 810 area.

FIGS. 8-9 depict a block diagram representation of a life interest user interface 900 configured for inputting life interests within the financial solution recommendation module, according to another embodiment of the present invention. The life interest user interface 900 includes a scrollable listing of life interest categories 910. Each category defines a life interest, for example, a charitable organization, a specific professional sports league, a particular college/university conference or the like. Scrolling of the life interest categories may be dictated by the type of platform on which the user interface is presented. For example, a conventional display may provide for "point, click and drag" movement of the life interest categories and a multi touch-screen display may provide for "touch and drag" or "flick" movement of the life interest categories. The life interest category 912 that is positioned in the center designation area corresponds to the listing of life interest items 920A-920H displayed below the life interest categories. For example, if the centered position life interest category is the National Basketball Association (NBA), the life interest items displayed may be logos or other identifying indicia representing NBA teams. In one aspect in which the life interest items display a logo or other identifying indicia, the item may be "clicked-on" or "touched and held" to display the name of the life interest item. The life interest items may be configured such that the list of the life interest items 920 are scrollable via arrow keys 930 to accommodate more life interest items than are viewable within the allotted life interest item area.

The life interest categories 910 may be arranged in alphabetical order or in any other suitable order. As such, life interest categories 914 positioned to the left of the center positioned life category 912 may reflect preceding alphabetically listed life interest categories, and life interest categories 916 positioned to the right of the center positioned life category 912 may reflect subsequent alphabetically listed life interest categories.

As shown in FIG. 9, a customer/user may move a life interest item 920 from the listing to the customer life interests area 940 to provide for a life interest input. In the illustrated example of FIG. 9, the customer/user has chosen/moved life interest items 920C and 920G into the customer life interests area 940. Moving of the life interest item into the customer's life interest area 940 may be dictated by the type of platform on which the user interface is presented. For example, a conventional display may provide for "point, click and drag" movement of the life interest item and a multi touch-screen display may provide for "touch and drag" or "flick" movement of the life interest item. If the customer desires to remove a life interest item from the customer life interests area 940, a "point, click and drag" or a "touch and drag/flick" movement of the item outside of the designated customer life interest area 940 will remove the item from the customer's designated listing.

FIGS. 10-14 depict a block diagram representation of a customer financial portfolio user interface 1000 configured for inputting financial portfolio information within the financial solution recommendation module, according to another embodiment of the present invention. The customer financial portfolio user interface 1000 includes a plurality of financial institution categories 1010, each category representing a financial institution. The categories may be arranged in alphabetical order such that the categories 1010A to the left of the center positioned category 1010B reflect the preceding alphabetically listed categories, and the categories 1010C to the right of the center positioned category 1010C reflect the subsequent alphabetically listed categories. The manner of movement of the financial institution categories 1010 may be dictated by the type of platform on which the user interface is presented. For example, a conventional display may provide for "point, click and drag" movement of the financial institution categories and a multi touch-screen display may provide for "touch and drag" or "flick" movement of the financial institution categories.

The center positioned financial institution category 1010B allows for the customer/user to designate the financial institution as one which the customer/user conducts business via the "active" indicator check box 1020. In certain instances the customer may be reluctant to provide any financial information beyond designating certain financial institutions as ones at which the customer conducts business.

Figure 10:
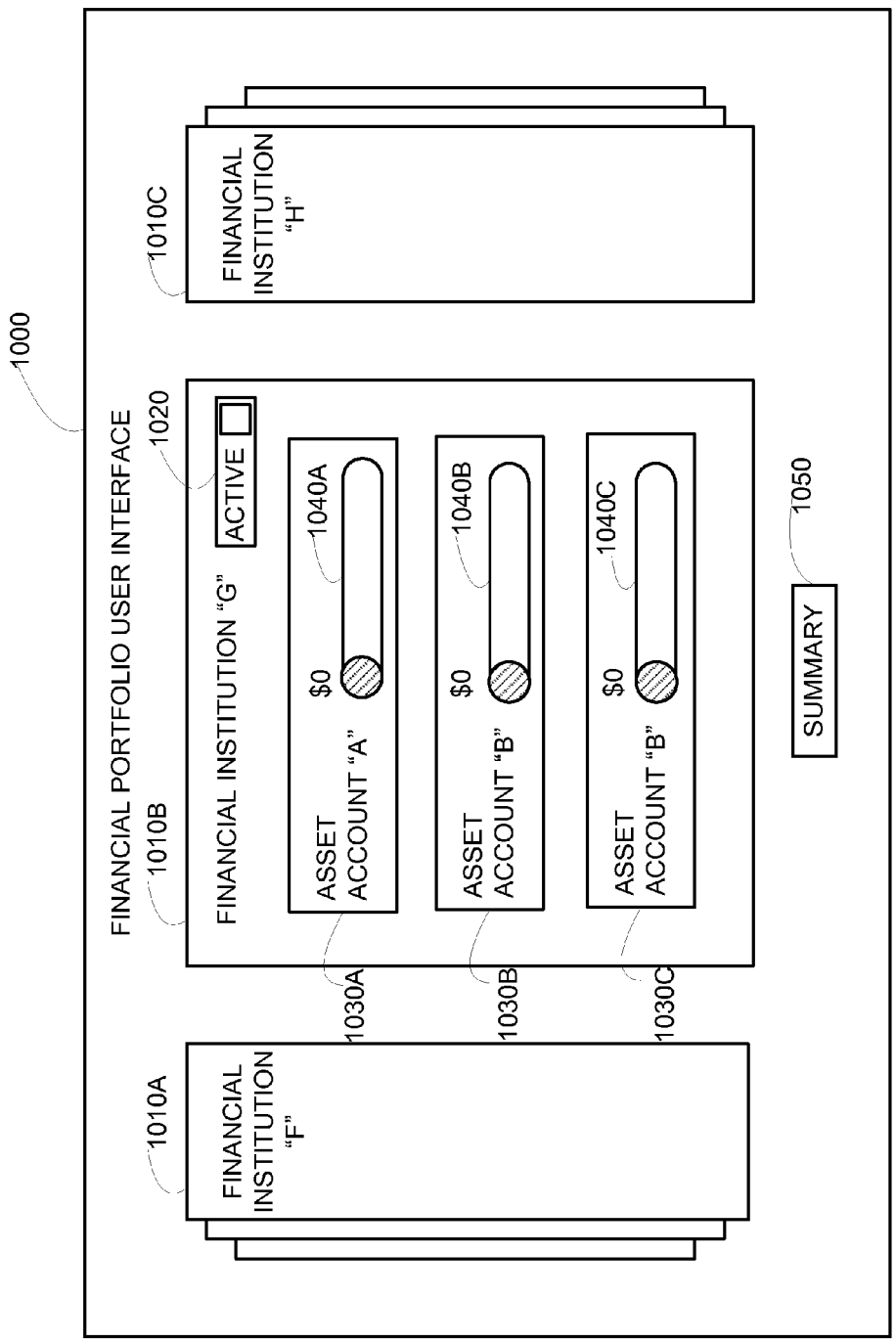
Figure 11:
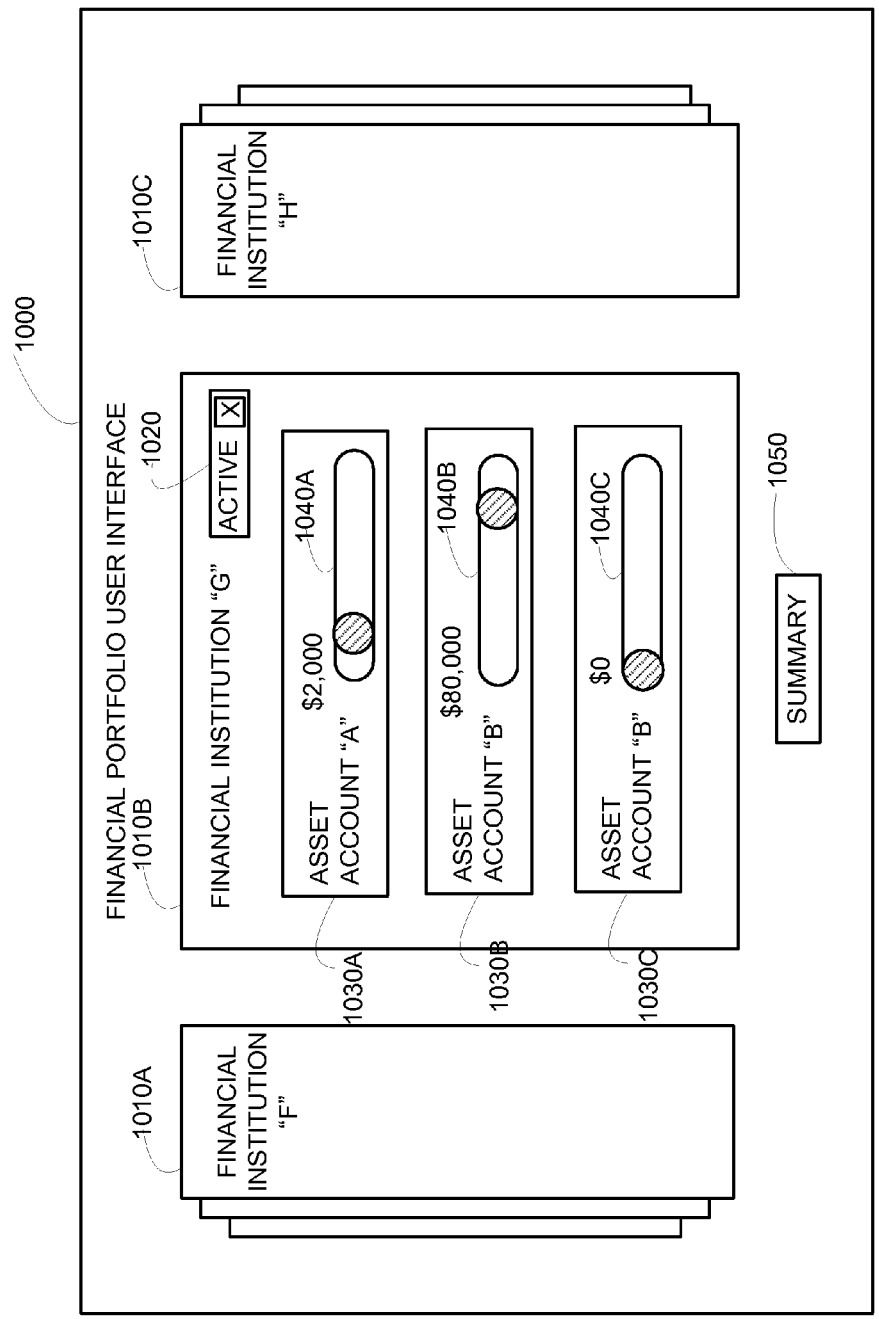

Additionally, the center positioned financial institution category 1010B provides for a listing of asset accounts 1030, such as asset account "A" 1030A, asset account "B" 1030B, and asset account "C" 1030C, which may correspond to a savings, checking, or investment account, or the like. Each asset account has a corresponding value entry mechanism 1040A, 1040B and 1040C, respectively, that are operable to provide for a value associated with the corresponding asset account. In the illustrated examples of FIGS. 10-14, the value entry mechanism is a sliding bar that allows the customer/user to define a proximate value for the account by sliding the bar to the appropriate position corresponding to the proximate value of the account. In FIG. 10, the value entry mechanism for all asset accounts reflects a value of zero prior to the customer/user inputting any account information into the financial institution category 1010B. Referring to FIG. 11, the financial portfolio user interface 1000 reflects a financial institution category 1010B in which the customer/user has made inputs to the value entry mechanisms 1040A and 1040B. Specifically, the value entry mechanism 1040A associated with asset account "A" 1030A reflects a value of $2,000 and the value entry mechanism associated with asset account "B" reflects a value of $80,000. It should be noted that the increments of the sliding bar may be configured to provide for a suitable range of account value. In addition, the check box 1020 may be configured to automatically update to the active status if one of the value entry mechanisms are engaged by the customer/user.

Figure 12:
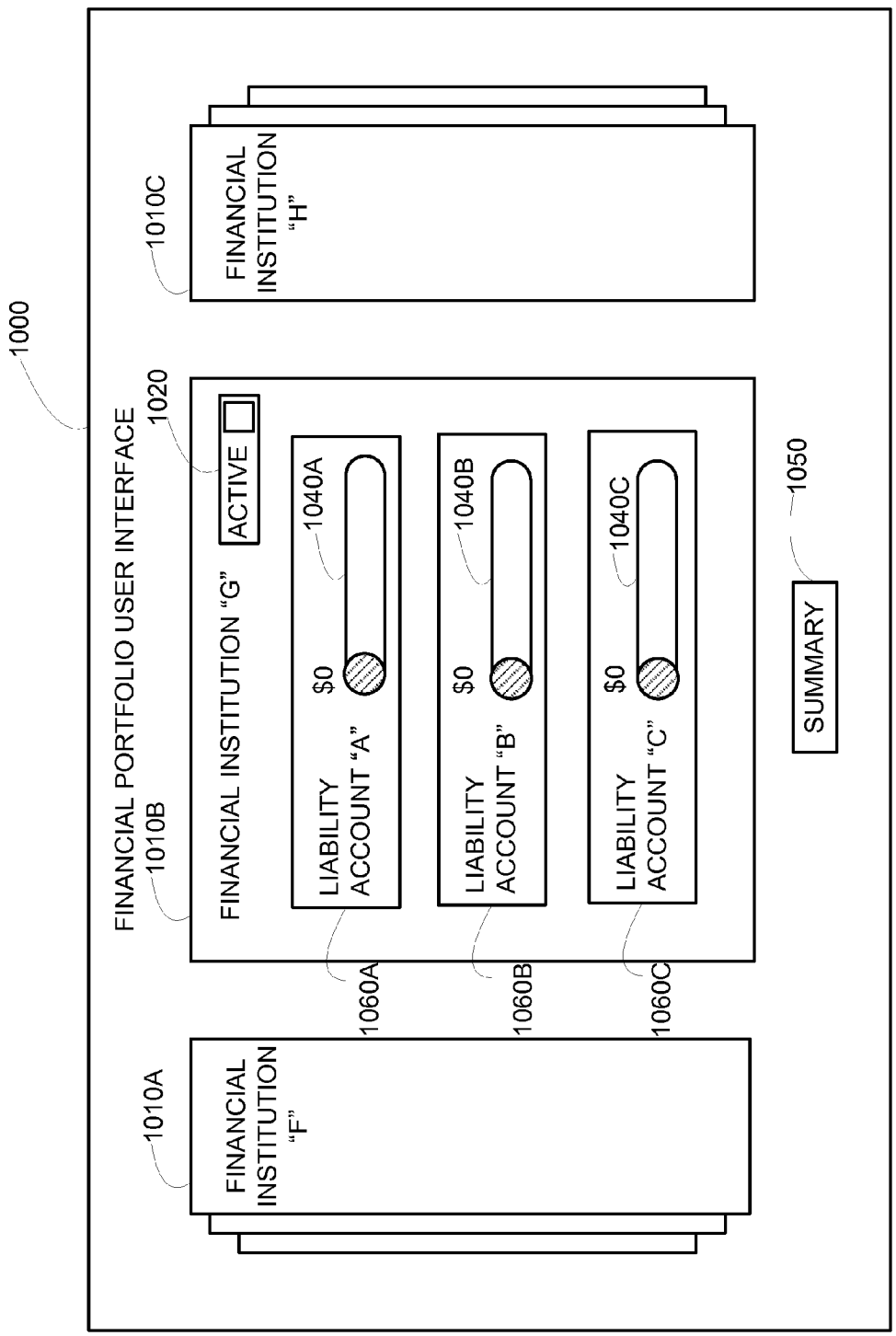

According to one aspect, the financial institution categories 1010 of financial portfolio user interface 1000 may be configured to be flipped on the y-axis to provide for display of the reverse side of the financial institution category 1010. The reverse side of the financial institution category 1010 includes information pertaining to the liability or debt accounts associated with the financial institution. Flipping the category to the reverse side may be accomplished by a "point and click" input on the category or a "tap" input on the category, depending on the platform used to present the user interface. FIG. 12 provides an example of financial institution category 1010B that has been flipped to the reverse side so as to display the liability/debt accounts, such as liability account "A" 1060A, liability account "B" 1060B and liability account "C" 1060C. The liability accounts may include, but are not limited to, home mortgage accounts, other loan accounts, credit category accounts and the like. Similar to the asset account, the liability accounts include a value input mechanism 1040A, 1040B and 1040C, such as a sliding bar or the like for inputting the value of the liability accounts.

Figure 13:
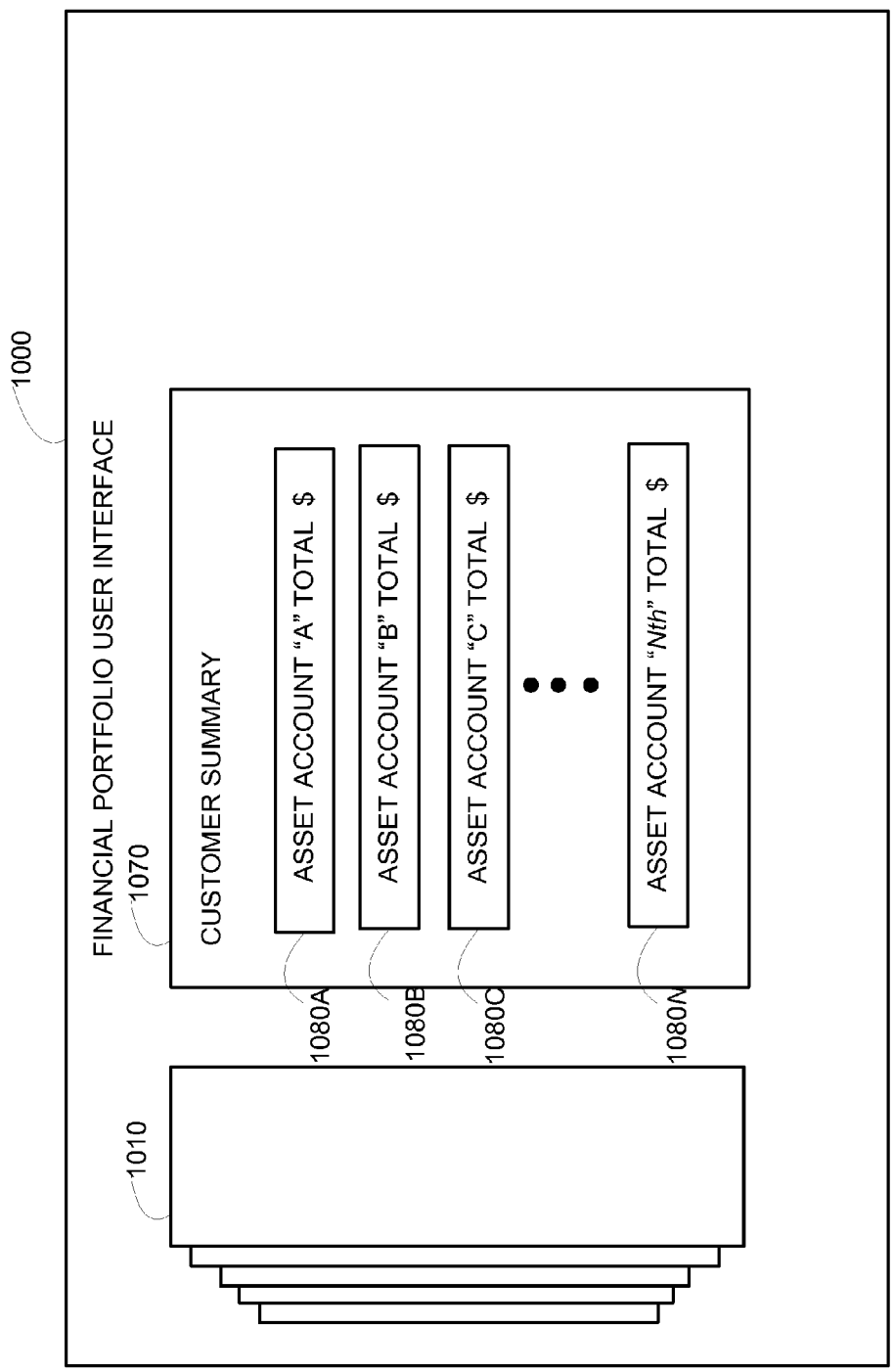
Figure 14:
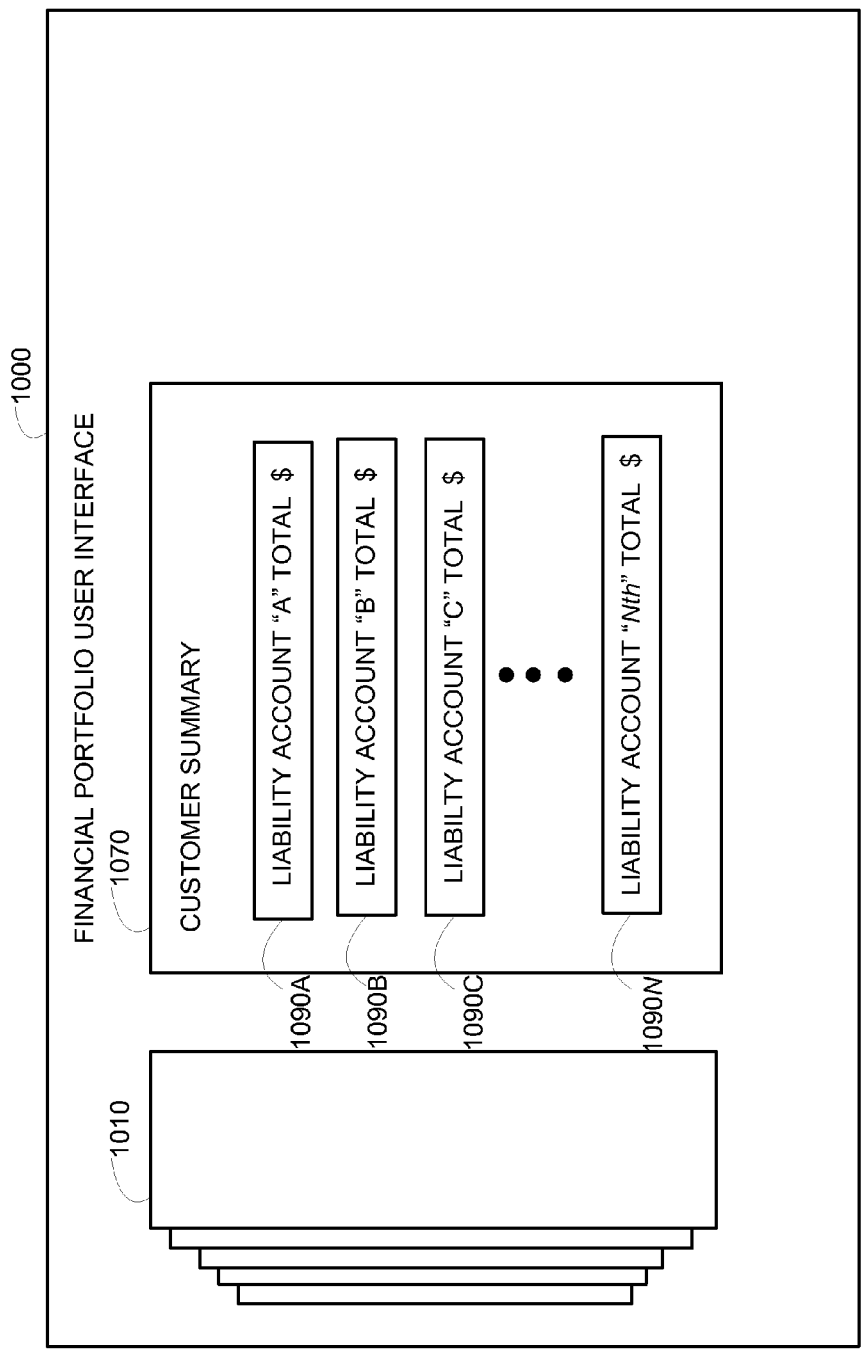

FIGS. 10-12 also reflect a summary key 1050 that, upon engaging, provides for display of a financial summary category that reflects the inputted totals for all asset and liability accounts. In addition to being accessible via the summary key 1050, the financial summary category may be configured as the last category in the ordered plurality of financial institution categories, such that scrolling all the categories from right to left also results in the display of the financial summary category. FIGS. 13-14 provide an example of the financial summary category 1070. As described, the financial summary category may be configured as the last category in the stack of financial institution categories and thus, all of the financial institution categories 1010 are shown to the left of the financial summary category 1070 in the display. The financial summary category 1070 may be configured similar to the financial institution categories, such that asset account totals are shown on the front side of the category and the liability/debt account totals are shown on the reverse side of the category. FIG. 13 reflects the asset totals for each individual asset account type, such as asset account "A" total 1080A, asset account "B" total 1080B, asset account "C" total 1080C and asset account "Nth" total where N is the last asset account type. The category may be flipped to the reverse side by a "point and click" input on the category or a "tap" input on the category, depending on the platform used to present the user interface. FIG. 14 reflects the liability totals for each individual liability/debt account type, such as liability account "A" total 1090A, liability account "B" total 1090B, liability account "C" total 1090C and liability account "Nth" total where N is the last liability account type.

Referring to FIGS. 15-16, block diagram representations of a financial product recommendation and customization user interface 1100 are shown, according to another embodiment of the present invention. The financial product recommendation and selection user interface 1100 includes a financial products area 1110 for displaying one or more financial products. In the illustrated aspect of FIG. 15, upon initially accessing the financial product recommendation and selection user interface 1100, the financial products area 1110 may display the financial product recommendations. As previously noted, the product recommendations may be based at least in part on the life events and associated proximate dates of occurrence and, in some embodiments, the life interests of the customer and the financial portfolio information of the customer. In the illustrated embodiment of FIG. 15, the financial products area 1110 includes recommendations for a category "B" affinity financial product 1112, such as an affinity credit card or the like, a category "C" financial product 1114, such as a checking account or the like and a category "D" financial product 1116, such as a protective service or the like. In addition, the category "B" affinity product has a pre-approval identifier 1118 operable to identify the product as one having requisite customer pre-approval. In addition, the financial products area 1110, the financial product recommendation and selection user interface 1100 may include a financial product option area 1120 operable for displaying other financial product options that may be offered to the customer.

As shown in FIG. 16, the other financial product options may be displayed by activating one of the financial product categories displayed along the periphery of the financial product option area 1120. As shown, the categories may include financial product category "A" 1122, financial product category "B" 1124, financial product category "C" 1126, financial product category "D" 1128, financial product category "E" 1130, and financial product category "F" 1132. In the illustrated aspect of FIG. 16, financial product category "E" has been activated (as indicated by the bold-faced type) to display the category "E" financial product options 1134 available to the customer in the financial product option area 1120. It should be noted that the financial product options available to a customer may be, but are not required to be, based at least in part on the life event data, the life interest data and/or the financial portfolio data.

As a means of customizing a financial product package, the customer/user may move financial products into or out of the financial product area 1120 to formulate a package. Financial products may be moved into the financial product area 1120 from the financial product option area 1120 by a "point, click, drag and drop" movement or a "touch and drag" movement, depending on the user interface platform implemented. Financial products may be moved out of the financial product area 1120 to remove the product from the potential financial product package.

In addition to the financial product area 1110 and the financial product option area 1120, the financial product recommendation and selection user interface 1100 may include a timeline display 1140 operable to provide quick access to the timeline buckets and associated life events in the life event user interface 800. In this regard, the customer and financial institution associate have viewable access to the previously inputted life events and associated proximate date, so as to rely on this information while configuring a financial product package.

The dollar sign key 1150 in the financial product area 1110 allows for the financial product package to be priced at any point in time as financial products are moved into and out of the financial product area 1120. Engagement of the dollar sign key 1150 will change the display of the key to reflect the dollar value of the package.

FIG. 17 reflects a block diagram of the detail view of a financial product as accessible from the financial product area 1110 or the financial product option area 1120 of the financial product recommendation and selection user interface 1100. In the illustrated example, the category "B" affinity financial product 1112 displayed in the financial product area 1110 has been engaged, such as by "tap" motion or "point and click" motion, depending on the user interface platform, to display the detailed view of FIG. 17. The detailed view may include, but is not limited to, product details 1200, optional pre-approval details 1202, if the customer qualifies for pre-approval, optional offers 1204 related to the financial product, if the customer qualifies for any offers and, in this particular example because the financial product is an affinity product, an option to change the affinity 1206.

If the customer chooses the change affinity option 1206, a listing of affinity options for the affinity product may be displayed in the user interface. An example of such a display is shown in the block diagram of FIG. 18. The affinity options presented in the display may correspond to life interests defined by the customer in the life interest user interface 900 and are available for the recommended or chosen affinity financial product. In the illustrated example, three additional affinity options are provided to the customer, affinity option "A" 1300, affinity option "B" 1302 and affinity option "C" 1304, each option having a corresponding check box 1306 operable to activate/de-activate an affinity. Additionally, an option to remove the affinity 1308 from the product altogether may be provided.

Referring to FIG. 19, is another block diagram of the detail view of a financial product as accessible from the financial product area 1110 or the financial product option area 1120 of the financial product recommendation and selection user interface 1100. The detailed view highlights product options available for a category "C" financial product 1114 depicted in the financial product area 1110.

In the illustrated example, the category "C" financial product 1114 displayed in the financial product area 1110 has been engaged, such as by "tap" motion or "point and click" motion, depending on the user interface platform, to display the detailed view of FIG. 19. The detailed view may include, but is not limited to, product options such as category "C" first product option 1400, category "C" second product option 1402, category "C" third product option 1404 and category "C" Nth product option where N is the last product option. Each product option has a check box 1410 associated with the option to activate/deactivate the option. For example, if the category "C" product is online banking, the options may include mobile banking, bill pay, or any other options. In addition some of the options may have a multi-media presentation associated with the option that may be presented to the customer by activating the video icon or other presentation icon identifier key 1420. In addition to category "C" options, the detailed view may provide for access to one or more tutorials, such as a category "C" product tutorial 1430 that explains the financial product, or a category "C" option tutorial 1432 that explains the financial product options.

Referring to FIG. 20, a block diagram is depicted of the comparison feature of the financial product recommendation and selection user interface 1110. At any point in time while customizing the financial products in the financial product area 1110, the customer may engage the comparison key 1160 to display a comparison between the currently configured financial product package and comparison financial products displayed in the comparison financial products area 1190. The comparison financial products 1190 may be configured to be equivalent to the initially displayed recommended financial products or the comparison financial products 1190 may be based on financial product packages purchased by other customers having similar demographics/ life events/life interests and/or financial portfolios. In the illustrated example shown in FIG. 20, the comparison financial products area 1190 highlights a category "A" financial product 1119 that differs from the products that the customer has customized in the financial product area 1110. The customer may further compare the customized financial product package to the comparison financial product package by engaging the dollar sign key 1150 to provide for a pricing for the customized package and/or the comparison package.

Once the customer has finalized their respective customized financial product package, the customer may engage the end key 1170 shown in FIGS. 15, 16 and 20 to complete the process and fulfill the package. Referring to FIG. 21, a representative block diagram is shown of a financial product fulfillment user interface 1500 that is operable to be displayed upon completion of the customization process. The financial product fulfillment user interface 1500 may include a print checks option 1502 to instantaneously print checks according to the customer's requirements, a print credit card 1504 option to instantaneously print and laminate a credit card/ debit card per the customer's requirements and a send financial product summary package option 1506 that automatically configures and sends via email, postal mail or the like the summary information pertaining to the customized and chosen financial product package.

Referring to FIGS. 22-28, block diagram representations of an alternative financial product recommendation and customization user interface 1600 are shown, according to another embodiment of the present invention. The financial product recommendation and selection user interface 1100 includes a financial products area 1610 for displaying one or more financial products. The financial products area 1610 includes a category selector 1612 operable for selecting amongst a plurality of financial product categories. In the illustrated examples of FIGS. 22-28 the financial product categories include "use money", "save money" and "manage money", although in other embodiments of the invention other financial product categories may be implemented or omitted. The category selector 1612 may be clickable, scrollable or the like as the operative means to display other financial product categories. Selection of a financial product category will, in turn, display one or more financial product sub-categories. For example, in the illustrated embodiment of FIG. 22, selection/display of the "use money" financial product category may display four financial product sub-categories: financial product sub-category "A" 1614; financial product sub-category "B" 1616; financial product sub-category "C" 1618; and financial product sub-category "D" 1620. For example, in the "use money" financial product category the four sub-categories may correspond to checking accounts; check categories; credit categories, online banking or the like.

Selection of a financial product sub-category, such as by touching, clicking or otherwise the respective financial product sub-category icon is operable to display one or more sub-category financial products in the financial product area 1610. In the illustrated example of FIG. 22, financial product sub-category "A" 1614 has been selected, as illustrated by the bold-faced text and the financial product area 1610 depicts three sub-category "A" products 1622, 1624 and 1626. For example, if financial product sub-category "A" 1614 is checking accounts, the sub-category "A" products 1622, 1624 and 1626 may correspond to three different checking account options. It should be noted that the sub-category products displayed, and otherwise offered to the customer, are based at least on the life events defined by the customer and, in some embodiments of the invention, the life interests and/or financial interests of the customer. For example, if the customer has identified a certain life interest, such as a professional sports team, the checking account offers that are displayed may be affinity checking account offers associated with the chosen professional sports team. As previously described, each sub-category product may be "touched". "clicked-on" or otherwise activated to display the features, benefits, fees or the like associated with that particular financial product.

In addition, the financial product recommendation and selection user interface 1600 of FIG. 22 includes a first category financial product selection area 1630. In the illustrated example of FIG. 22 the first category financial product selection area 1630 corresponds to the "use money" category. FIG. 23 depicts the financial product recommendation and selection user interface 1600 in which the user has completed selection of sub-category financial products from all of the financial product sub-categories within the "use money" category. Thus, financial product sub-category "D" 1620 is highlighted and the financial product area 1620 reflects corresponding sub-category "D" financial products 1627 and 1629. The financial product 1620 originally displayed sub-category "D" financial product 1636, but that product has been selected and moved to the customer's first category financial product selection area 1630.

The first category financial product selection area 1630 reflects the customer selected/configured financial products associated with the first category. As such, the first category financial product selection area 1630 reflects three different sub-category financial products: sub-category "A" financial product 1632; sub-category "C" financial product 1634 and sub-category "D" financial product 1636. The sub-category financial products may be "tapped/clicked and dragged" or otherwise moved to the first category financial product selection area 1630.

In the illustrated embodiment of FIG. 24, the "save money" financial product category has been selected by the user from category selector 1612 to display two financial product sub-categories: financial product sub-category "A" 1640; and financial product sub-category "B" 1642. For example, in the "save money" financial product category the two sub-categories may correspond to savings accounts; investment accounts or the like. In the illustrated example of FIG. 24, financial product sub-category "A" 1640 has been selected, as illustrated by the bold-faced text and the financial product area 1610 depicts five sub-category "A" products 1644, 1646, 1648, 1650 and 1652. For example, if financial product sub-category "A" 1640 is savings accounts, the sub-category "A" products 1644, 1646, 1648, 1650 and 1652 may correspond to five different savings account options.

In addition, the financial product recommendation and selection user interface 1600 of FIG. 24 includes a second category financial product selection area 1660. In the illustrated example of FIG. 24 the second category financial product selection area 1660 corresponds to the "save money" category. FIG. 25 depicts the financial product recommendation and selection user interface 1600 in which the user has completed selection of sub-category financial products from all of the financial product sub-categories within the "save money" category. Thus, financial product sub-category "B" 1642 is highlighted and the financial product area 1620 reflects corresponding sub-category "B" financial products 1643, 1645, 1647, 1649 and 1651. The financial product 1620 originally displayed sub-category "B" financial product 1668, but that product has been selected and moved to the customer's second category financial product selection area 1660.

The second category financial product selection area 1660 reflects the customer selected/configured financial products associated with the second category. As such, the second category financial product selection area 1660 reflects four different sub-category financial products: first sub-category "A" financial product 1662; second sub-category "A" financial product 1664, third sub-category "A" financial product 1666 and sub-category "B" financial product 1668.

In the illustrated embodiment of FIG. 26, the "manage money" financial product category has been selected by the user from the category selector 1612 to display three financial product sub-categories: financial product sub-category "A" 1670; financial product sub-category "B" 1672 and financial product sub-category "C" 1674. For example, in the "manage money" financial product category the three sub-categories may correspond to mortgage/home equity accounts; loan accounts, protective services or the like. In the illustrated example of FIG. 26, financial product sub-category "A" 1670 has been selected, as illustrated by the bold-faced text and the financial product area 1610 depicts two sub-category "A" products 1676 and 1678. For example, if financial product sub-category "A" 1640 is mortgage/home equity accounts, the sub-category "A" products 1674 and 1676 may correspond to a mortgage options and/or home equity options.

In addition, the financial product recommendation and selection user interface 1600 of FIG. 26 includes a third category financial product selection area 1680. In the illustrated example of FIG. 26 the third category financial product selection area 1680 corresponds to the "manage money" category. FIG. 27 25 depicts the financial product recommendation and selection user interface 1600 in which the user has completed selection of sub-category financial products from all of the financial product sub-categories within the "manage money" category. Thus, financial product sub-category "C" 1674 is highlighted and the financial product area 1620 reflects corresponding sub-category "C" financial products 1675, 1677 and 1679. The financial product 1620 originally displayed sub-category "C" financial product 1684, but that product has been selected and moved to the customer's third category financial product selection area 1680.

The third category financial product selection area 1680 reflects the customer selected/configured financial products associated with the third category. As such, the third category financial product selection area 1680 reflects two different sub-category financial products: sub-category "A" financial product 1682 and sub-category "C" financial product 1684.

Additionally, FIG. 27 illustrates a price point key 1686 for pricing the financial product package that the user has assembled/configured. It should be noted that the price point key 1686 may be displayed and activated throughout the configuration process to assess the price of the financial product package at any point in time. Activation of the key 1686 may correspond to display of the price in lieu of display of the dollar sign. FIG. 27 also includes a comparison key 1688 that is operable, upon activation, of displaying a comparative data. Comparative data is illustrative of what other customer's having similar demographics have chosen as their financial product package in the past. The similar demographic data is based at least in part on the defined life events and, in some embodiments, the defined life interests and the defined financial interests (i.e., assets and liabilities). The done/end key 1689, upon activation, finalizes the financial product package and may lead to the display of a product fulfillment user interface, such as the one depicted and described in relation to FIG. 21.

FIG. 28 depicts an example of the financial product recommendation and selection user interface 1600 in which the comparison data is depicted, in accordance with another embodiment of the present invention. The right-hand side of the user interface 1600 displays the previously configured/selected customer choices for their respective financial package. The left-hand side of the user interface 1600 displays, upon activation of, comparison key 1688, the comparative data 1690. The comparative data 1690 displays the financial products generally chosen by someone having similar demographics. For example, in the illustrated example of FIG. 28, the comparative data 1690 shows that similarly situated customer has a financial product package that includes in the first financial product category 1700, referred to as the "use money" category", four sub-category products: sub-category "A" financial product 1702; sub-category "B" financial product 1704; sub-category "C" financial product 1706 and sub-category "D" financial product 1708. In the second financial product category 1710, referred to as the "save money" category", four sub-category products: first sub-category "A" financial product 1712; second sub-category "B" financial product 1714; first sub-category "B" financial product 1716 and second sub-category "B" financial product 1718. In the third financial product category 1720, referred to as the "manage money" category", three sub-category products: sub-category "A" financial product 1722; sub-category "B" financial product 1724; and sub-category "C" financial product 1726. The user/customer has the option of selecting one or more of the financial products in the comparison data 1690 for inclusion in their respective financial product package. In one embodiment, the user may "click/point and drag" the icon associated with the sub-category product from the comparative data 1690 side to the customer's configured financial product package to consider or re-configure their package. Financial products that the customer no longer desires in their package, for example a product being replaced by a similar product in the comparative data 1690, may be removed by dragging the associated icon to an area outside of the financial product category areas.

Thus, methods, systems, computer programs and the like have been disclosed that provide for an interactive financial solution recommendation module/tool for collaboratively recommending financial solutions for a customer. Embodiments described above provide for dynamically building financial solution recommendations based on received inputs. These inputs, which may be received from the customer, an associate collaborating with the customer or from a customer database, may include customer behaviors, customer attitudes, customer life events, customer life interests, customer personal/profile data, customer financial data, such as portfolio data and the like. Based on the received inputs, financial solution recommendations are determined and presented to the customer in real time or near time. As such, the customer is able to instantaneously see how each recommendation criteria input impacts the financial solution recommendations providing transparency to the exchange of value. Further, embodiments of the present invention provide for inputs to the financial solution recommendation tool/module to be received in a non-linear fashion, such that a customer or a collaborating associate may provide inputs at various entry points within the module/tool to accommodate specific financial solution needs of the customer.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for dynamically providing financial solution recommendations, the method comprising:
providing for a financial solution recommendation application having a plurality of entry points, wherein each entry point is associated with a corresponding financial solution;
receiving, via a computing device, a plurality of first inputs that each define criteria for recommending financial solutions;
determining, via a computing device processor, one or more financial solution recommendations based on the plurality of first inputs received;
providing, via a computing device display, a presentation of the one or more financial solution recommendations;
receiving, via a computing device, one or more second inputs at one of the plurality of entry point points, wherein the entry point defines a specific financial solution;
determining, via a computing device processor, each time a second input is received, whether to update the one or more financial solution recommendations based on both the plurality of first inputs and the second input, wherein update includes one of adding to the financial solution recommendations or deleting from the financial solution recommendations;
updating, via the computer device display, the presentation of one or more financial solution recommendations based on receipt of one or more second inputs, wherein the update results in presentation of two or more financial solution recommendations that conflict and wherein the update occurs in real-time or near-real time to receiving a second input, such that the customer is capable of immediate comprehension of an impact that the second input has on the one or more financial solution recommendations;
determining, via a computing device, a best fit financial solution recommendation from amongst the two or more financial solution recommendations that conflict; and
updating, via the computing device display, the presentation to include a first notation that the two or more financial solution recommendations are conflicting and a second notation indicating the best fit financial solution recommendation from amongst the two or more financial solutions.

2. The method of claim 1, wherein receiving the plurality of first inputs further comprises receiving, via the computing device, the plurality of first inputs, wherein each of the first inputs define at least one of a customer financial behavior, a customer financial attitude, a customer life event, a customer life interest, customer personal data or customer financial portfolio data.

3. The method of claim 1, wherein receiving the plurality of first inputs further comprises receiving in a non-linear order, via the computing device, the plurality of first inputs, wherein the non-linear order allows the plurality of first inputs to be received at specific entry points associated with specific financial solutions desired based on the customer's financial needs.

4. The method of claim 1, wherein receiving the plurality of first inputs further comprises receiving, via the computing device, the plurality of first inputs, wherein one or more of the first inputs are in response to one or more queries posed to the customer.

5. The method of claim 1, wherein receiving the plurality of first inputs further comprises receiving, via the computing device, the plurality of first inputs, wherein one or more of the first inputs are received or derived from stored customer data, wherein the customer data includes one or more of profile data, account data, or transaction data.

6. The method of claim 1, wherein receiving the plurality of first inputs further comprises receiving, via the computing device, the plurality of first inputs, wherein one or more of the first inputs are in response to one or more queries posed to the customer and one or more first inputs are received or derived from stored customer data, wherein the customer data includes one or more of profile data, account data, or transaction data.

7. The method of claim 1, wherein determining the one or more financial solution recommendations further comprises determining, via the computing device processor, the one or more financial solution recommendations, wherein the financial solution recommendations include at least one of a financial product, a financial service or an offer related to a financial product or a financial service.

8. The method of claim 1, further providing, via the computing device display, access to one or more networked multimedia demonstrations, each demonstration related to one or more of the financial solution recommendations provided for in the presentation.

9. The method of claim 1, further providing, via the computing device display, access to one or more networked tutorials, each tutorial related to one or more of the financial solution recommendations provided for in the presentation.

10. An apparatus for providing dynamic financial solution recommendations, the apparatus comprising:
  a computing platform having at least one processor and a memory in communication with the processor, and
  a financial solution recommendation module stored in the memory, executable by the processor, including a plurality of entry points associated with a corresponding financial solution, and configured to:
    receive a plurality of first inputs that each define criteria for recommending financial solutions;
    determine one or more financial solution recommendations based on the plurality of first inputs received;
    provide a displayable presentation of the one or more financial solution recommendations;
    receive one or more second inputs at a one of the plurality of entry points, wherein the entry point defines a specific financial solution;
    determine, each time a second input is received, whether to update the one or more financial solution recommendations based on both the plurality of first inputs received and the second input received, wherein update includes one of adding to the financial solution recommendations or deleting from the financial solution recommendations;
    update the presentation of one or more financial solution recommendations based on receipt of one or more second inputs, wherein the update results in presentation of two or more financial solution recommendations that conflict and wherein the update occurs in real-time or near-real time to receiving a second input, such that the customer is capable of immediate comprehension of an impact that the second input has on the one or more financial solution recommendations;
    determine a best fit financial solution recommendation from amongst the two or more financial solution recommendations that conflict; and
    update the presentation to include a first notation that the two or more financial solution recommendations are conflicting and a second notation indicating the best fit financial solution recommendation from amongst the two or more financial solutions.

11. The apparatus of claim 10, wherein the module is further configured to receive the plurality of first inputs, wherein each of the first inputs define at least one of a customer financial behavior, a customer financial attitude, a customer life event, a customer life interest, customer personal data or customer financial portfolio data.

12. The apparatus of claim 10, wherein the module is further configured to receive the plurality of first inputs in a non-linear order, wherein the non-linear order allows the plurality of first inputs to be received at specific entry points associated with specific financial solutions desired based on the customer's financial needs.

13. The apparatus of claim 10, wherein the module is further configured to receive the plurality of inputs, wherein one or more of the first inputs are in response to one or more queries posed to the customer.

14. The apparatus of claim 13, wherein the module is further configured to present one or more user interfaces that display the one or more queries and provide for receiving one or more of the plurality of inputs.

15. The apparatus of claim 10, wherein the module is further configured to receive customer data from a customer database and derive one or more of the first inputs from the customer data, wherein the customer data includes one or more of profile data, account data, or transaction data.

16. The apparatus of claim 15, wherein the module is further configured receive one or more of the first inputs in response to one or more queries posed to the customer and derive one or more inputs from the customer data, wherein the customer data includes one or more of profile data, account data, or transaction data.

17. The apparatus of claim 10, wherein the module is further configured to determine the one or more financial solution recommendations, wherein the financial solution recommendations include at least one of a financial product, a financial service or an offer related to a financial product or a financial service.

18. The apparatus of claim 10, wherein the module is further configured to provide access to one or more networked multi-media demonstrations, each demonstration related to one or more of the financial solution recommendations that are provided.

19. The apparatus of claim 10, wherein the module is further configured to provide access to one or more networked tutorials, each tutorial related to one or more of the financial solution recommendations that are provided.

20. A computer program product, comprising:
  a non-transitory computer-readable medium comprising sets of codes for causing a computer to perform steps including:
    receiving a plurality of first inputs that each defines criteria for recommending financial solutions;
    determining one or more financial solution recommendations based on the plurality of first inputs;
    providing a displayable presentation of the one or more financial solution recommendations;
    receiving one or more second input inputs at a specific entry point, wherein the specific entry point defines a specific financial solution based on a customer's needs;
    determining, each time a second input is received, whether to update the one or more financial solution recommendations based on both the plurality of first inputs received and the second input received, wherein update includes one of adding to the financial solution recommendations or deleting from the financial solution recommendations;

updating the presentation of one or more financial solution recommendations based on receipt of one or more second inputs, wherein the update results in presentation of two or more financial solution recommendations that conflict and wherein the update occurs in real-time or near-real time to receiving a second input, such that the customer is capable of immediate comprehension of an impact that the second input has on the one or more financial solution recommendations;

determining a best fit financial solution recommendation from amongst the two or more financial solution recommendations that conflict; and updating the presentation to include a first notation that the two or more financial solution recommendations are conflicting and a second notation indicating the best fit financial solution recommendation from amongst the two or more financial solutions.

21. The computer program product of claim 20, wherein receiving the plurality of first inputs further comprises receiving the plurality of first inputs wherein each of the first inputs define at least one of a customer financial behavior, a customer financial attitude, a customer life event, a customer life interest, customer personal data or customer financial portfolio data.

22. The computer program product of claim 20, wherein receiving the plurality of first inputs further comprises receiving, in a non-linear order, the plurality of first inputs, wherein the non-linear order allows the plurality of first inputs to be received at specific entry points associated with specific financial solutions desired based on the customer's financial needs.

23. The computer program product of claim 20, wherein receiving the plurality of first inputs further comprises receiving the plurality of first inputs wherein one or more of the first inputs are in response to one or more queries posed to the customer.

24. The computer program product of claim 20, wherein receiving the plurality of first inputs further comprises receiving the plurality of first inputs wherein one or more of the first inputs are derived from stored customer data, wherein the customer data includes one or more of profile data, account data, or transaction data.

25. The computer program product of claim 20, wherein receiving the plurality of first inputs further comprises receiving the plurality of first inputs wherein one or more of the first inputs are in response to one or more queries posed to the customer and one or more first inputs are derived from stored customer data, wherein the customer data includes one or more of profile data, account data, or transaction data.

26. The computer program product of claim 20, wherein determining the one or more financial solution recommendations further comprises determining the one or more financial solution recommendations, wherein the financial solution recommendations include at least one of a financial product, a financial service or an offer related to a financial product or a financial service.

27. The computer program product of claim 20, wherein the steps further include providing access to one or more networked multi-media demonstrations, each demonstration related to one or more of the financial solution recommendations that are provided.

28. The computer program product of claim 20, wherein the steps further include providing access to one or more networked tutorials, each tutorial related to one or more of the financial solution recommendations that are provided.

* * * * *